(12) United States Patent
Smith et al.

(10) Patent No.: US 7,375,784 B2
(45) Date of Patent: May 20, 2008

(54) CONTROL OF LIQUID CRYSTAL ALIGNMENT IN AN OPTICAL DEVICE

(75) Inventors: Nathan Smith, Oxford (GB); Paul A. Gass, Headington (GB); Jonathan P. Bramble, Nottinghamshire (GB); Martin D. Tillin, Oxfordshire (GB); Bronje M. Musgrave, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 371 days.

(21) Appl. No.: 11/072,563

(22) Filed: Mar. 4, 2005

(65) Prior Publication Data
US 2005/0248705 A1 Nov. 10, 2005

(30) Foreign Application Priority Data
Mar. 6, 2004 (GB) .................. 0405165.2

(51) Int. Cl.
*G02F 1/1337* (2006.01)
(52) U.S. Cl. ............... 349/129; 349/130; 349/132; 349/193; 349/200
(58) Field of Classification Search ............... 349/124, 349/129, 191, 193, 130, 132, 200
See application file for complete search history.

(56) References Cited

U.S. PATENT DOCUMENTS

| | | | | |
|---|---|---|---|---|
| 4,878,742 A | * | 11/1989 | Ohkubo et al. | 349/201 |
| 5,032,009 A | * | 7/1991 | Gibbons et al. | 349/124 |
| 5,446,569 A | * | 8/1995 | Iwai et al. | 349/124 |
| 5,652,634 A | * | 7/1997 | Hirata et al. | 349/129 |

(Continued)

FOREIGN PATENT DOCUMENTS

EP 768562 A2 * 4/1997

(Continued)

OTHER PUBLICATIONS

UK Patent Office Search Report for Application No. GB0405165.2.*

(Continued)

*Primary Examiner*—Andrew Schechter
*Assistant Examiner*—Matthew P Lawson
(74) *Attorney, Agent, or Firm*—Renner, Otto, Boisselle & Sklar, LLP

(57) ABSTRACT

A method is provided that allows simultaneous control of macroscopic azimuthal and zenithal liquid crystal alignment ($\phi$, $\theta$) across a liquid crystal layer by controlling the area ratios between first, second and third different types of alignment region (T1, T2, T3) in a patterned alignment layer, the three different types of alignment region (T1, T2, T3) tending to induce liquid crystal alignment in the liquid crystal layer in three different respective, non-coplanar, principal orientations (z, x, y). In the illustrated example, the first type of alignment region (T1) tends to induce substantially homeotropic alignment (in the z direction) and the second and third types of alignment region (T2, T3) tend to induce substantially planar alignment in different, orthogonal, principal orientations (in the x and y directions). Control of macroscopic zenithal liquid crystal alignment ($\theta$) is achieved by controlling the area ratios between the homeotropic (T1) and planar region types (T2, T3), and control of macroscopic azimuthal liquid crystal alignment ($\phi$) is achieved by controlling the area ratio between the two planar region types (T2, T3).

49 Claims, 15 Drawing Sheets

U.S. PATENT DOCUMENTS

| | | | |
|---|---|---|---|
| 5,825,448 A * | 10/1998 | Bos et al. | 349/128 |
| 5,880,798 A * | 3/1999 | Walton et al. | 349/99 |
| 5,903,330 A | 5/1999 | Funfschilling et al. | |
| 6,798,481 B2 * | 9/2004 | Kitson et al. | 349/129 |
| 6,989,880 B2 * | 1/2006 | Takato et al. | 349/129 |
| 2001/0005249 A1 * | 6/2001 | Stebler et al. | 349/123 |

FOREIGN PATENT DOCUMENTS

| | | |
|---|---|---|
| EP | 1 139 153 A1 | 10/2001 |
| GB | 2 023 866 A | 1/1980 |
| JP | 63014123 A * | 1/1988 |

OTHER PUBLICATIONS

English translation of Chinese Office Action dated Apr. 2007, for Chinese Application No. 200510078303.6.

\* cited by examiner

A GRIN lens array with three lenses and segmented electrodes

CONTROL OF LIQUID CRYSTAL ALIGNMENT IN AN OPTICAL DEVICE

BACKGROUND OF THE INVENTION

1. Field of the Invention

The present invention relates to the control of macroscopic liquid crystal alignment in a liquid crystal layer, and to an optical device comprising a liquid crystal layer having its macroscopic liquid crystal alignment controlled in this way.

2. Description of the Related Art

FIG. 1 of the accompanying drawings illustrates the co-ordinate system of a LC director (average molecular orientation) in space. The angle $\theta$ is the zenithal (out of plane) angle while $\phi$ is the azimuthal (in-plane or planar) angle. The angle $\theta$ is also known as the tilt angle while $\phi$ is also known as the twist angle. The LC layer (or substrate) is in the x-y plane.

Patterning of liquid crystal alignment on a gross scale is known. In this context, gross patterning refers to alignment regions that have a lateral extension larger than the thickness of the liquid crystal layer. The resulting liquid crystal layer has at least two domains that are optically distinct with the patterning in one region having negligible effect on the patterning of a neighbouring region.

Patterning of alignment on a fine scale (~1 µm) in liquid crystal devices has also been disclosed previously. "Surface alignment bistability of nematic liquid crystals by orientationally frustrated surface patterns" Kim et al, Applied Physics Letters, 78, pp3055 (2001) describes azimuthal micropatterning in two directions and demonstrates bi-stable bulk director orientations. "Tristable nematic liquid crystal device using micropatterned surface alignment" Kim et al, Nature 429, pp159 (2002) describes azimuthal micropatterning in three directions and demonstrates tri-stable bulk director orientations. Kim et al do not disclose spatially varying the proportions of the patterned alignment regions or mention possible devices that could result from such patterning. The azimuthal patterning in both these papers is achieved using an atomic force microscope (AFM) to rub the substrate and achieve domains that have a width of 4 µm (down to 0.5 µm). However, it takes between 2 and 10 hours to rub an area the size of a single pixel (90 µm×90 µm) using an atomic force microscope (AFM). Consequently, AFM rubbing is not considered to be a production-viable technique "Alignment of nematic liquid crystals by inhomogeneous surfaces" Ong et al, Journal of Applied Physics, 57, pp186 (1985) describes the use of a surface composed of patches that favour homeotropic alignment that are surrounded in a matrix favouring planar alignment. The resulting zenithally patterned surface produces a bulk pretilt that is between planar and homeotropic. The pretilt is a function of the area ratio between the homeotropic and planar alignment regions. However, this zenithal patterning method relies on SiO and metal film deposition, and SiO deposition is not considered a production-compatible technique. The fabrication method described by Ong et al could not be used to spatially vary the proportions of the homeotropic and planar alignment directions. Therefore the average bulk zenithal angle will be the same everywhere (i.e. no spatial variation of zenithal retardation is possible). Ong et al do not disclose spatially varying the proportions of the patterned alignment regions or mention possible devices that could result from such patterning.

Zenithally bistable displays (ZBD) have been disclosed in several patents, for example in WO 97/14990. All ZBD devices have a locally uniform surface pretilt on a grating structure The resulting bulk optical properties of the ZBD are a consequence of the topology of the undulating surface.

The techniques mentioned above are considered either to rely on commercially incompatible production methods or to have insufficient patterning flexibility to enable a number of novel optical elements to be made, or both.

SUMMARY OF THE INVENTION

According to a first aspect of the present invention there is provided a method allowing simultaneous control of macroscopic azimuthal and zenithal liquid crystal (LC) alignment across a LC layer by controlling the area ratios between first, second and third different types of alignment region in a patterned alignment layer, the three different types of alignment region tending to induce LC alignment in the LC layer in three different respective, non-coplanar, principal orientations.

The second and third types of alignment region may tend to induce alignment in substantially orthogonal principal orientations.

In one embodiment, the first type of alignment region tends to induce substantially homeotropic alignment and the second and third types of alignment region tend to induce substantially planar alignment in different respective principal orientations, with control of macroscopic zenithal LC alignment being achieved by controlling the area ratios between the homeotropic and planar region types, and control of macroscopic azimuthal LC alignment being achieved by controlling the area ratio between the two planar region types.

The alignment layer may be patterned by providing an alignment layer having a substantially uniform initial alignment of the first type, applying a first patterning step to create alignment regions of the second type and a second patterning step to create any required alignment regions of the third type.

The area ratio between any two types of alignment regions may be zero for at least part of the LC layer. For example, the area ratio between the third and second types may be zero for at least part of the LC layer. This may be the case for the whole of the LC layer.

At least one of the types of alignment region may have two choices of slightly different alignment to provide further control of macroscopic LC alignment. The two choices for a type of alignment region may be aligned equally about the principal alignment orientation for that type. The two choices for a type of alignment region may be used in substantially equal area ratios. The two choices for a type of alignment region may be substantially in a plane containing the principal alignment orientation of another type of alignment region. The second type of alignment region may have two such choices, with the two choices of the second type being used on opposite sides of an alignment region of the first type. The another type of alignment region may be the first type of alignment region. The two choices for a type of alignment may differ by less than 20 degrees.

The alignment layer may be patterned at least in part by photoalignment. The alignment layer may be patterned at least in part by rubbing. The alignment layer may be patterned at least in part by surface relief grating. The alignment layer may be patterned at least in part by the selective printing (for example, micro contact printing) of at least two types of material one on top of another, each type of material tending to induce a type of alignment different to another type of material of the at least two types. The alignment layer may be patterned at least in part by forming at least two layers of material, each layer tending to induce a type of alignment different to another layer, and selectively removing parts of at least one of these layers to expose parts of at least one layer beneath. The alignment layer may be patterned at least in part by selectively modifying the surface energy of the alignment layer.

A second alignment layer may be provided on a face of the LC layer opposite the patterned, first, alignment layer. The two alignment layers may cooperate to induce a macroscopic pattern of liquid crystal alignment that focuses incident light of a particular linear polarisation. The two alignment layers may cooperate to induce a macroscopic pattern of liquid crystal alignment that rotates the polarisation of incident light of a particular linear polarisation. The two alignment layers may cooperate to induce a V-state pi-cell pattern of liquid crystal alignment in the LC layer. The second alignment layer may also be patterned according to the claimed method. The second alignment layer may be provided with the same patterning of alignment region types as the first alignment layer.

The first alignment layer may induce a first macroscopic pattern of liquid crystal alignment in a first region of the LC layer, and the second alignment layer induces a second macroscopic pattern of liquid crystal alignment, different to the first macroscopic pattern, in a second region of the LC layer, substantially distinct from the first region of the LC layer. The first and second regions may form respective sub-layers within the LC layer, with the first region being disposed between the first alignment layer and the second region.

The alignment layer patterning may be periodic at least in part The alignment layer patterning may be random at least in part.

At least one lateral dimension of the patterned types of region may be comparable to or less than the thickness of the LC layer. Macroscopic alignment changes may be achievable on a scale comparable to or less than the thickness of the LC layer.

At least one of the area ratios between first, second and third different types of alignment region may vary across the alignment layer. The variation of the at least one area ratio may occur on a scale comparable to or less than the thickness of the LC layer.

As just one example, the scale mentioned above may be of the order of 1 µm or less.

The variation mentioned above may be controlled such that the macroscopic pattern of liquid crystal alignment across the LC layer presents a varying retardation for incident light of a particular linear polarisation. The variation in retardation may provide a wavefront modulation function for light of that polarisation. The variation in retardation may provide a lens function for light of that polarisation.

The area ratios for the first and second alignment layers may be varied, with the variation being controlled such that the first macroscopic pattern of liquid crystal alignment presents a varying retardation for incident light of a first linear polarisation, and the second macroscopic pattern of liquid crystal alignment presents a varying retardation for incident light of a second linear polarisation, different to the first linear polarisation. A lens function may be provided for both first and second linear polarisations.

A uniform macroscopic pattern of LC alignment may be formed across the LC layer to form a birefringent optical element having its optic axis aligned at an angle to one of its surfaces so as to provide an image shifting function for light incident on that surface.

According to a second aspect of the present invention there is provided an optical device comprising a liquid crystal (LC) layer and at least one patterned alignment layer, the LC layer having a macroscopic pattern of azimuthal and zenithal LC alignment across the LC layer achieved using a method according to the first aspect of the present invention.

The optical device may have macroscopic zenithal alignment in at least part of the LC layer between 10 and 80 degrees away from planar alignment.

The macroscopic alignment pattern may have two or more stable configurations. The macroscopic alignment may be switchable between the two or more stable configurations by applying an electric field and/or applying a magnetic field and/or applying a mechanical force and/or inducing a macroscopic fluid flow within the LC layer. The macroscopic alignment pattern may have two stable configurations differing from one another in the macroscopic zenithal angle in at least part of the LC layer.

The optical device may comprise an arrangement for applying an electric and/or magnetic field across at least part of the LC layer, such that the macroscopic alignment pattern of the at least part of the LC layer is dependent on the at least one alignment layer and on any applied field.

The optical device may be switchable from a first mode in which the LC has a macroscopic alignment pattern determined substantially by the at least one alignment layer, to a second mode in which the LC has a macroscopic alignment pattern that is determined substantially by the applied field.

The field-applying arrangement may be operable to apply different electric and/or magnetic fields across different parts of the LC layer.

The field-applying arrangement may comprise electrodes. At least some of the electrodes may be segmented.

The optical device may comprise an arrangement for changing the polarisation of light input to the device.

According to a third aspect of the present invention there is provided a Graded Refractive Index, GRIN, lens comprising an optical device according to the second aspect of the present invention.

The GRIN lens may be a twisted nematic GRIN lens.

According to a fourth aspect of the present invention there is provided an optical retarder comprising an optical device according to the second aspect of the present invention.

According to a fifth aspect of the present invention there is provided a parallax barrier comprising an optical retarder according to the fourth aspect of the present invention and at least one polariser.

According to a sixth aspect of the present invention there is provided a display device comprising an optical device, lens, retarder or barrier according to a previously-described aspect of the present invention.

The display device may be a multiple view display device.

According to a seventh aspect of the present invention there is provided a wavefront modulator comprising an optical device according to the second aspect of the present invention.

According to an eighth aspect of the present invention there is provided an image shifter comprising an optical device according to the second aspect of the present invention.

DETAILED DESCRIPTION OF THE PREFERRED EMBODIMENTS

Before specific applications embodying the present invention are described, the general principles underlying embodiments of the present invention will first be described.

Figure 1:
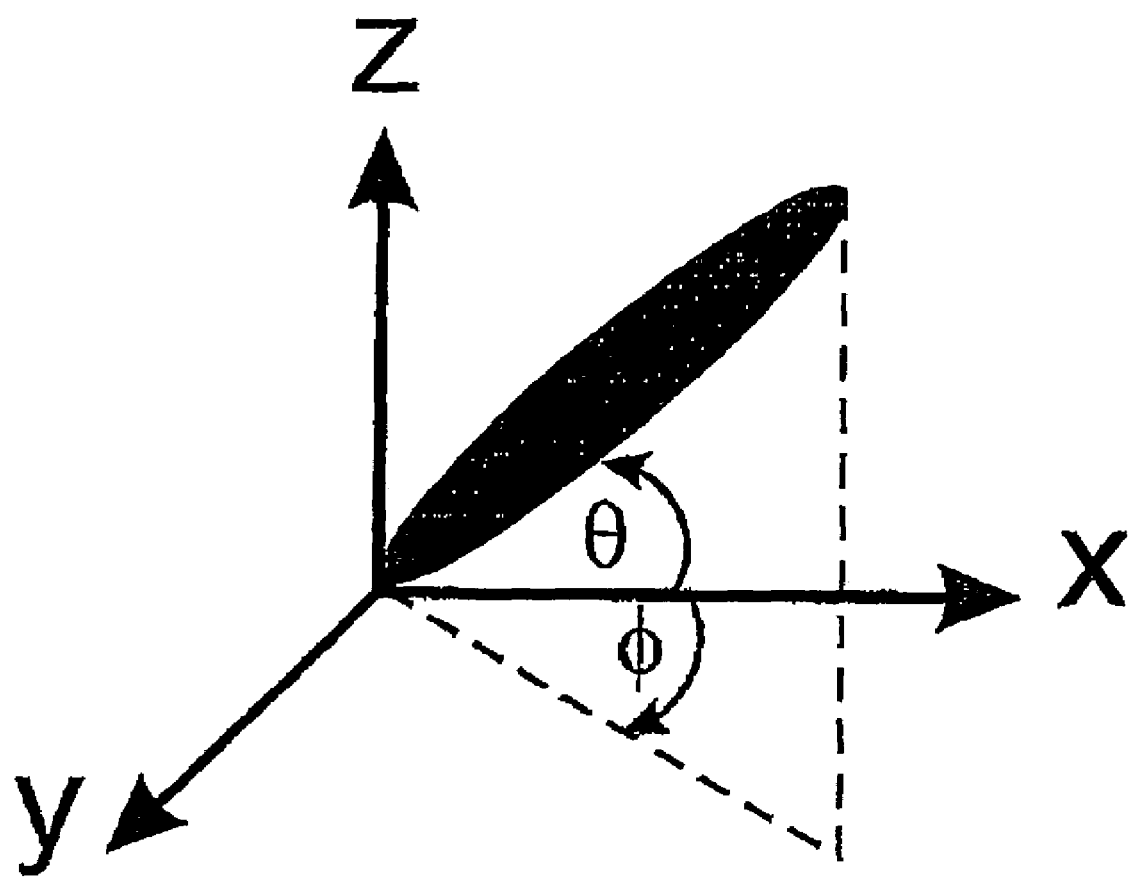
FIG. 1, discussed hereinbefore, illustrates the co-ordinate system of a LC molecule in space.

Consider a substrate that has an alignment layer that produces homeotropic alignment in its unprocessed state (i.e. LC molecular alignment is parallel with the z-axis in accordance with the coordinate system shown in FIG. 1 when the alignment layer has not been rubbed, or exposed to UV and so on). One patterned processing step can then be used to create regions of surface alignment parallel to one of the in-plane axes, say the x-axis. If a cell were to be constructed after one patterned processing step, then the bulk optic axis will lie in the x-z plane at all points within the cell (i.e. the molecular alignment has a constant value of $\phi$ at all points in the x-y plane). However, the angle that the optic axis makes with the substrate ($\theta$) may or may not vary spatially in the x-y plane. Whether the optic axis angle, $\theta$, varies spatially in the x-y plane or not depends upon the details of the micropatterning.

Figure 2:
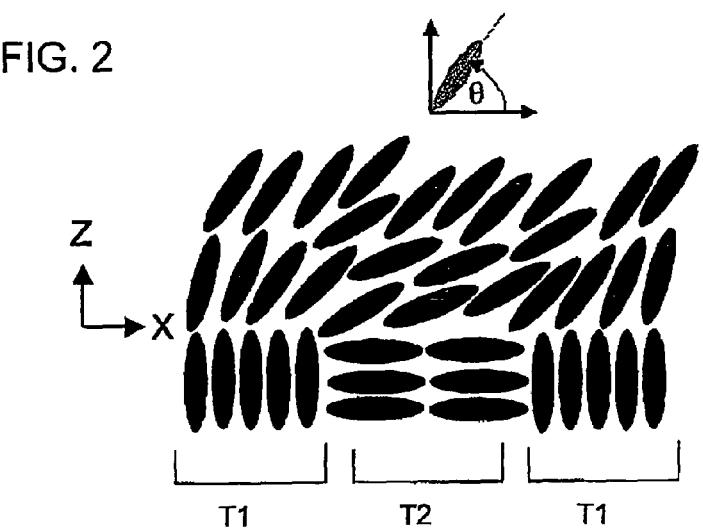
FIG. 2 illustrates how macroscopic zenithal liquid crystal alignment can be set by use of two different types of alignment region in a patterned alignment layer embodying the present invention.

FIG. 2 illustrates how macroscopic zenithal liquid crystal alignment can be set by use of two different types T1 and T2 of alignment region in a patterned alignment layer. The first type T1 of alignment region tends to induce substantially homeotropic LC alignment (substantially in the z direction) in the LC layer, while the second type T2 of alignment region tends to induce substantially planar LC alignment in the LC layer (in this example, substantially in the x direction). The mean macroscopic director orientation in the bulk is a function of: (i) the area ratio of one type of patterning to another; (ii) the anisotropic elastic constants of the liquid crystal itself; and (iii) the relative anchoring strengths of the different patterned areas. In the example shown in FIG. 3, it can be seen that in the bulk of the LC layer the macroscopic zenithal angle assumes an angle $\theta$.

Figure 3:
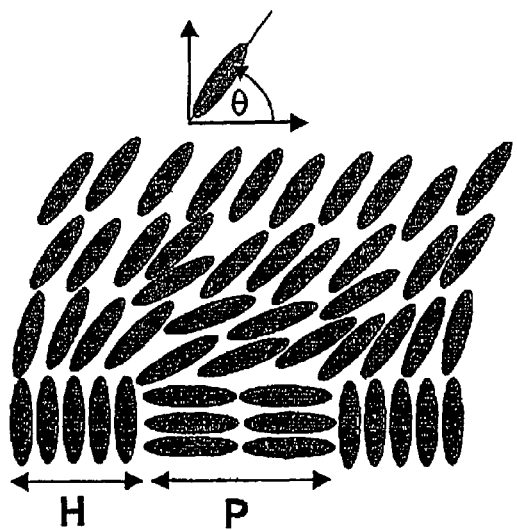
FIG. 3 illustrates how macroscopic zenithal liquid crystal alignment can be varied by altering the area ratio of two different types of alignment region in a patterned alignment layer embodying the present invention.
Figure 3:
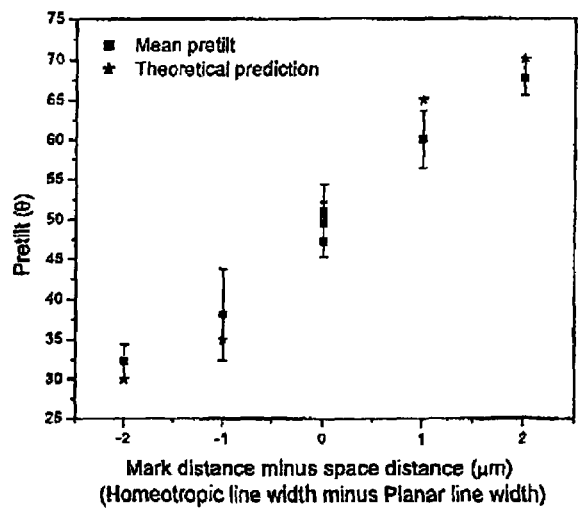

As will now be described with reference to FIG. 3, by varying the proportions of homeotropic to planar alignment, a whole range of intermediate pretilts $\theta$ is achievable. In FIG. 3, homeotropic-type regions are arranged alternately with planar-type regions, with the width of the homeotropic-type regions being denoted as "H" and the width of planar-type regions being denoted as "P". The proportion of homeotropic to planar regions can be varied by altering these two widths. The proportion can be expressed as an area ratio between two different types of alignment region. In the simple example shown in FIG. 3, the proportion can also be expressed as the width of the homeotropic-type regions minus the width of the planar-type regions. The graph on the right hand side of FIG. 3 shows how the macroscopic pre-tilt angle $\theta$ is made to vary between about 30 degrees and about 70 degrees by altering the area ratio of homeotropic-type regions to planar-type regions; appropriate patterning can be used to achieve any bulk pretilt (zenithal) angle.

Using one patterned processing step as described above with reference to FIGS. 2 and 3 enables fine control of the zenithal alignment. Adding a second patterned processing step enables even more complicated structures to be fabricated. The use of a second patterned processing step can be employed to create regions of surface alignment parallel to the remaining in-plane axis (i.e. the y-axis). Constructing a cell after the second patterned processing step yields a cell whose bulk optic axis is no longer necessarily constrained to a single plane (i.e. the molecular alignment can have different values of $\phi$ at different spatial positions in the x-y plane). Again, the angle that the optic axis makes with the substrate ($\theta$) may or may not vary spatially in the x-y plane.

By using two patterned processing steps it is possible to yield a device that locally has a bulk alignment direction [$\theta_1$, $\phi_1$] at an arbitrary lateral position [$x_1$, $y_1$]. This is only possible if the two processing steps yield non-parallel alignment directions and that the two processed alignment directions are also non-parallel with the unprocessed alignment direction. The alignment directions need not be orthogonal.

In addition, by varying the local micropatterning (i.e. varying the proportions of the different alignment directions), then bulk alignment $[\theta_1, \phi_1]$ at $[x_1, y_1]$ can be transformed to $[\theta_2, \phi_2]$ at $[x_2, y_2]$. Transforming one arbitrary alignment direction to another can only occur within the constraints of elastic continuum theory. In practice this means that in order to transform between $[\theta_1, \phi_1]$ at $[x_1, y_1]$ to $[\theta_2, \phi_2]$ at $[x_2, y_2]$, the distance between the two points (i.e $\sqrt{\{(x_1-x_2)^2+(y_1-y_2)^2\}}$) has to be large enough to accommodate the elastic energy associated with the distortion. This distance is a function of the distortion of the molecular alignment and the liquid crystal material itself.

Figure 4:
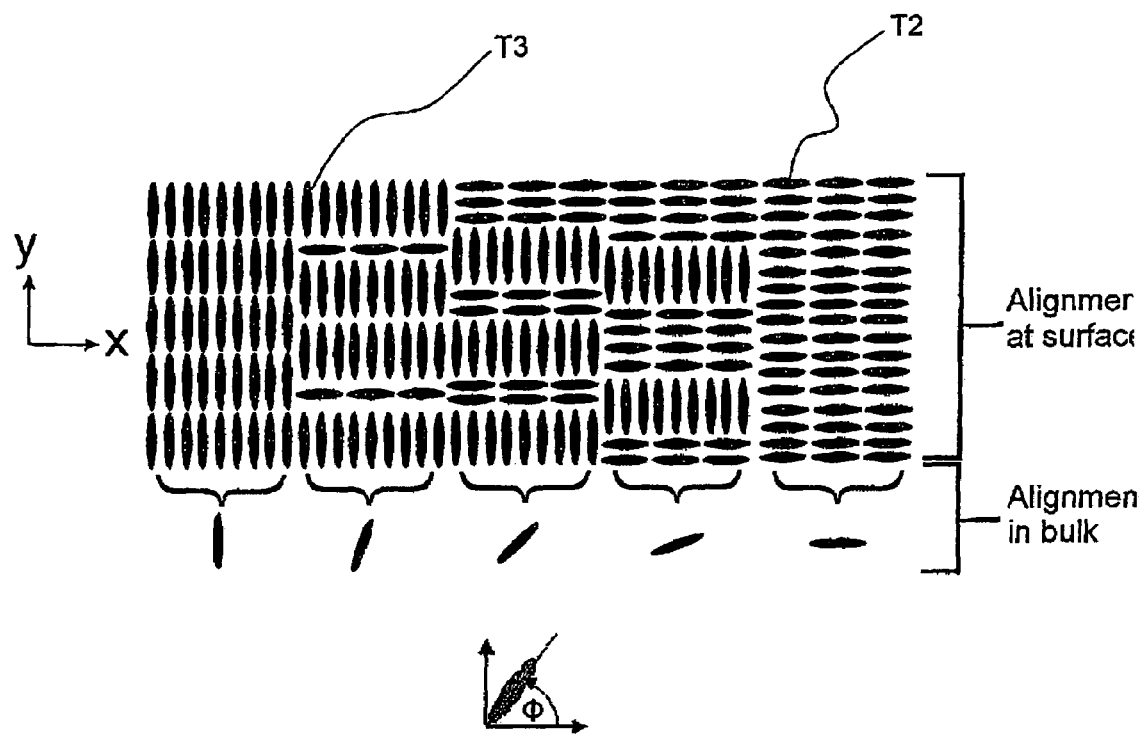
FIG. 4 illustrates how macroscopic azimuthal liquid crystal alignment can be set by use of two different types of alignment region in a patterned alignment layer embodying the present invention.

FIG. 4 illustrates how macroscopic azimuthal liquid crystal alignment can be set by use of two different types T2 and T3 of alignment region in a patterned alignment layer. The second type T2 of alignment region tends to induce planar LC alignment in the x direction, as for the second type in the example described above with reference to FIG. 2. The third type T3 of alignment region tends to induce planar LC alignment in the y direction, i.e. with alignment orthogonal to the second type. Again, the mean macroscopic director orientation in the bulk is a function of: (i) the area ratio of one type of patterning to another, (ii) the anisotropic elastic constants of the liquid crystal itself; and (iii) the relative anchoring strengths of the different patterned areas. By varying the proportions of the two orthogonal planar alignments, a whole range of intermediate azimuthal angles $\phi$ is achievable across a liquid crystal layer. Again, the relative proportions can be expressed as an area ratio between two different types T2 and T3 of alignment region.

Arbitrary molecular alignment can be achieved at an arbitrary position on a substrate via the use of two patterned processing steps. However, a continuous transformation between one arbitrary bulk alignment direction to another can only occur if the distance between the two points is large enough to accommodate the elastic energy associated with the LC distortion. The use of patterned processing steps that break the alignment degeneracy at the surface in order to increase the amount of curvature distortion are now discussed.

Figure 5:
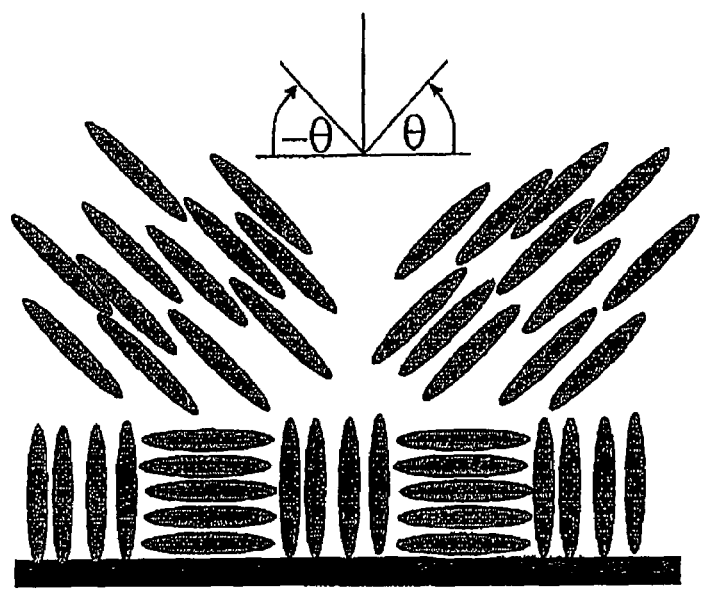
FIG. 5 illustrates alignment degeneracy at the surface of a liquid crystal layer.

With reference to FIG. 5, consider a substrate that receives a single patterned processing step. As described previously, the initial alignment direction is parallel to the z-axis while the patterned processing step produces patches of alignment parallel to the x-axis. The resulting bulk molecular orientation actually has two stable configurations, i.e. a bulk molecular tilt of $\theta e$, symmetric about the z-axis. Due to experimental variations in film processing, thermal fluctuations etc., the bulk molecular alignment adopts either the $+\theta$ or the $-\theta$ configuration in macroscopic domains. These macroscopic domains are separated by a reverse tilt wall.

Figure 6:
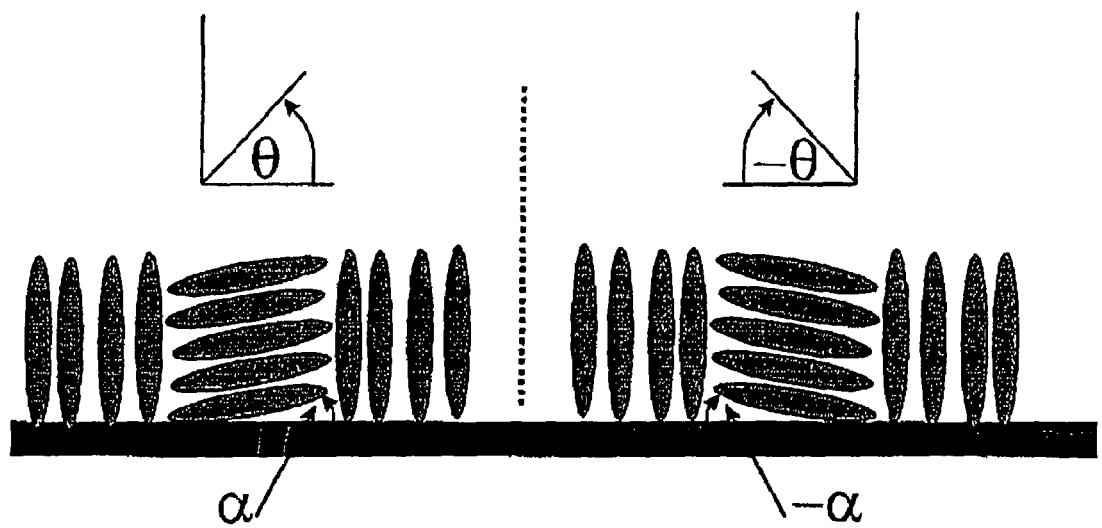
FIG. 6 illustrates the use in an embodiment of the present invention of a minor tilt angle in one of the types of alignment region to break the degeneracy shown in FIG. 5.

Consider now a situation where the patterned processing step produces alignment that is not perfectly parallel to the x-direction on the surface, but has in addition a small component in the direction parallel to the z-axis. The local molecular alignment at the surface now has pre-tilt angle, $\alpha$, that is relatively small (for example, less than 10°), as is illustrated in FIG. 6. The magnitude of the pre-tilt is dependent on the alignment layer/liquid crystal combination amongst other things. This pre-tilt acts to break the energetic degeneracy of the two bulk molecular alignment directions and hence only one bulk macroscopic tilt is observed. With reference to FIG. 6, this would mean that either the $+\theta$ or $-\theta$ state would form but not both.

Figure 7:
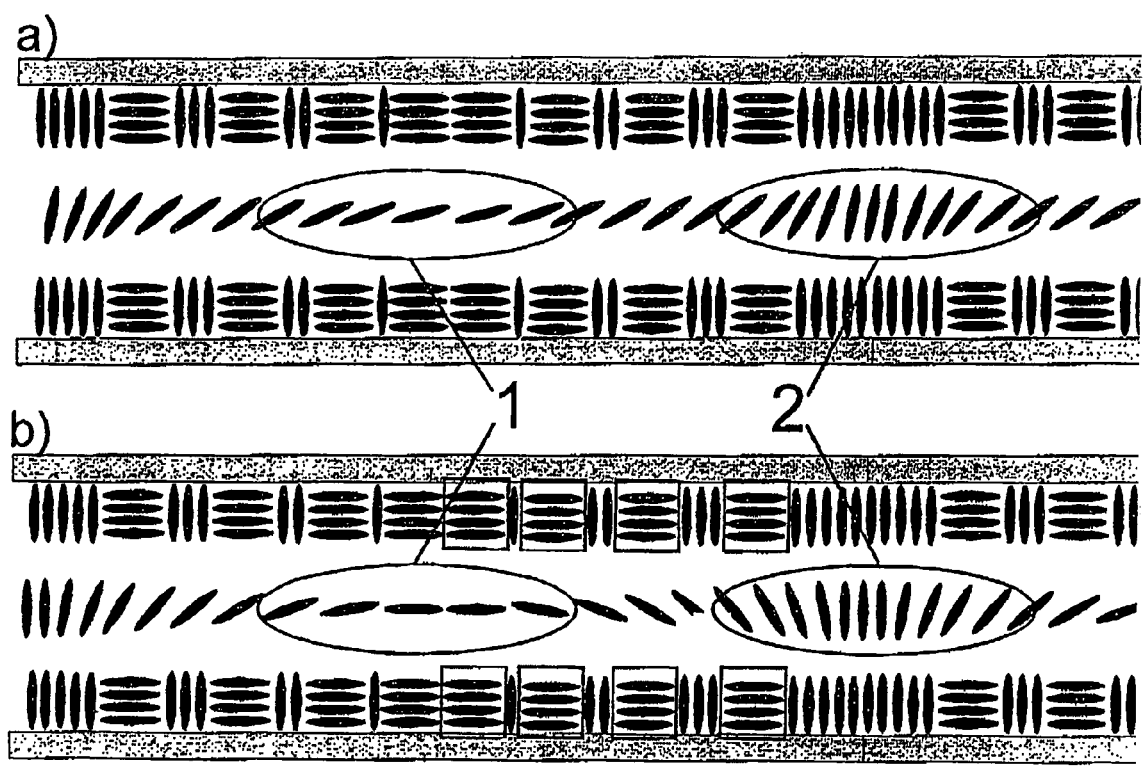
FIGS. 7(a) and (b) illustrate the use in an embodiment of the present invention of alignment regions of +α and −α to increase distortions sustainable by the liquid crystal.

Use of patterned processing steps that give alignment regions of both $+\alpha$ and $-\alpha$ can be used to increase distortions sustainable by the LC, as will be demonstrated with reference to FIGS. 7(a) and (b). In this illustration, particular consideration will be given to the bulk tilt, $\theta$, in regions where it is desired to be either ~0° (marked as "1") or ~90° (marked as "2").

Firstly, consider the situation where only one pretilt is used (say $+\alpha$), as is illustrated in FIG. 7(a). The bulk tilt, $\theta$, can never equal 0° since even if no homeotropic ($\theta=90°$) areas were used, the bulk tilt would simply equal that of the pretilt (i.e. $\theta=\alpha$) everywhere on the substrate. Attaining $\theta\sim90°$ is possible using one pretilt so long as the micropatterned area containing the purely 90° regions extends laterally in the x-y plane for a distance equal to or greater than the cell thickness.

Now consider the situation where both pretilts are used ($+\alpha$ and $-\alpha$), as is illustrated in FIG. 7(b). In FIG. 7(b) the planar aligned regions marked in squares have a pretilt of $-\alpha$, whereas the rest have $+\alpha$. The bulk pretilt can now equal zero owing to the averaging of adjacent patterned areas of opposite pretilt (i.e. the average of $+\alpha$ and $-\alpha$ is 0°). To attain $\theta\sim90°$, consider the homeotropic area marked as "2" in FIG. 7(b), bounded on one side by an area of $+a$ pretilt and on the other side by an area of $-a$ pretilt. The reverse bulk tilt either side of the homeotropic region prevents the homeotropic region from tilting. Using this technique bounding a homeotropic region with planar regions of opposite tilt enables greater LC distortions to be attained compared to the use of single pretilt patterned processing steps. Consequently, significant lateral variations in the bulk molecular orientation (confined to the x-z plane) can now occur over shorter distances.

The above technique can be extended to alignment parallel to the other planar direction (i.e. alignment largely parallel to the y-axis can also have a pretilt). This enables an increase in curvature distortions in two dimensions (i.e. the x-y plane). Although it has been described above that the aligning properties of the planar alignment regions are altered, it will be appreciated that the same effect can be achieved by altering the aligning properties of the homeotropic alignment regions.

Periodic patterning of the surface causes periodic distortions in the LC orientation near the surface. The lateral length scales and thickness of these periodic distortions are such that light passing through micropatterned optical elements will be diffracted. For some embodiments disclosed herein such diffraction would have no effect on performance, while for other embodiments the diffraction can actually be useful. However, for those embodiments for which diffraction will degrade performance it is possible to avoid optical diffraction by using random, rather than periodic alignment patterns.

With embodiments of the present invention, alignment domains are generally on a scale that is comparable to, or smaller than, the liquid crystal layer thickness. The resulting bulk optical properties of the liquid crystal layer at a particular point are a function of the alignment regions that are within proximity of that point. In essence, the bulk optical properties are a function of at least two alignment domains.

Both bulk azimuthal and bulk zenithal alignment can be controlled simultaneously via the appropriate micropatterning of the surface. This enables any macroscopic bulk director configuration to be obtained at any lateral position within a device or display. Patterning may occur on one or both substrates that comprise the device. The alignment patterning can be either periodic or random. The patterning can be achieved using any production compatible technique, for example rubbing, photo-alignment, grating etc. Patterning can be achieved by selective printing (for example, micro contact printing) of a material that induces the desired alignment state, either on its own or in cooperation with an adjacent layer or layers of aligning material. Patterning can be achieved by deposition of at least two layers on top of each other and then selectively removing parts of the upper layer or layers to expose regions of the lower layer or layers, with each layer inducing different alignment states. The alignment layer can also be patterned at least in part by selectively modifying the surface energy of the alignment layer.

Patterning two or more alignment directions locally on a surface will result in a mean macroscopic alignment direction, provided that the locally patterned regions are comparable to, or smaller than, the overall thickness of a cell. The mean macroscopic liquid crystal director orientation in the bulk may have two or more energetically stable configurations.

Although it has been described above that the three different types of alignment region T1, T2 and T3 are formed as a planar alignment layer, it will be appreciated that the regions may be patterned onto either a planar or a non-planar surface.

Some advantages of embodiments of the present invention over existing technology will briefly be described before a description of the specific embodiments.

All liquid crystal displays and devices require some form of alignment technology. No previously-considered commercial LCD fabrication utilises micropatterning of the surface to achieve mean bulk director orientation as in an embodiment of the present invention. LCDs that can be spatially patterned with an intermediate bulk tilt ($10°<\theta<80°$) that varies across the x-y plane have not been previously described A micropatterned surface in an embodiment of the present invention can be used to achieve any pretilt (i.e. the angle range $0°<\theta<90°$ is realisable).

LCDs and devices that have intermediate pretilts have applications such as image shifters, GRIN lenses etc, as will be described in more detail below. Such devices can be fabricated using a minimum of only one patterned processing step. Complete control over the director orientation (i.e. arbitrary $\theta$, $\phi$ orientation at an arbitrary position in x-y plane) can be achieved using a minimum of two patterned processing steps. The use of two patterned processing steps can be used to transform one arbitrary alignment direction continuously to another situated elsewhere on the substrate within the constraints of the continuum theory. The use of additional patterned processing steps that break the alignment degeneracy at the surface can be used in order to increase the amount of curvature distortion.

The director structures in an embodiment of the present invention are achieved solely through the micropatterned alignment at the substrate surfaces, so that no power is required to "activate" the micropatterned optical devices, unlike many similar elements that have been described previously in the literature. The micropatterned director structures in an embodiment of the present invention can also be switchable, unlike many similar elements (fabricated from quartz, reactive mesogen etc.) which have been described previously in the literature.

Alternatively, the director structures in an embodiment of the present invention can be permanently fixed; the resulting structures are invariant to electric fields, thermal cycling etc. This can be achieved in two different ways. One method is to fill a cell (that has patterned alignment regions) with a mixture of LC and monomer precursors. Exposure to UV light polymerises the monomers to form a network and the resulting structure is effectively inert to external physical conditions. Another method that achieves the same goal is to fill a cell (that has patterned alignment regions) with a reactive mesogen (RM) and then polymerise the RM with UV light.

Specific applications of the present invention will now be described.

Optical phase retarders are used to control the phase and polarisation state of reflected or transmitted light. Conventional spatial phase retardation plates consist of many actively addressed liquid crystal pixels that each act as a separate variable retarder. The resolution of this type of spatial light modulator is limited to the pixel resolution (~50 μm). The phase retardation impressed upon an incident ray is therefore invariant over the area of one pixel.

Patterned passive retardation plates have also been previously disclosed. In these devices the optic axis assumes one of two possible macroscopic orientations. The size of a domain in which the optic axis remains invariant is usually ~100 μm and consequently the use of the device is limited to a few specific applications.

A micropatterned optical phase retarder according to an embodiment of the present invention can be used to control continuously the retardation at a considerably higher resolution than a pixel (~1 μm). The phase change a beam experiences is related to both the zenithal ($\theta$) angle and the azimuth angle ($\phi$) of the bulk optic axis relative to the incident light. Therefore a polarised wavefront that has continuously varying phase and polarisation state can be transformed into a new polarised wavefront that may or may not have spatially varying phase and polarisation state. Any polarised input wavefront can be transformed into any desired polarised wavefront. In order to fabricate such a device, the alignment layer would be patterned to induce the desired optic axis orientations (desired $\theta$ and $\phi$) across the x-y plane.

An embodiment of the present invention can also be applied to the manufacture of "soft" parallax barriers, for example for use in multiple view and three-dimensional autostereoscopic display devices. Soft parallax barriers, which are disclosed in GB-A-2352573 and GB-A-2315902, have a spatially non-uniform transmission function. Such a soft parallax barrier can be fabricated using a micropatterned alignment technique embodying the present invention. Suitable micropatterning is applied to the alignment layer or layers to fabricate a retarder that has a spatially varying retardation of a predetermined pitch. The retarder is sandwiched between suitable polarisers to produce a non-uniform transmission function (i.e. a soft parallax barrier results). The functional form of the spatial intensity distribution will depend on the details of the micropatterning. For example, the micropatterning may be: (a) homeotropic and planar to produce controllable pretilt (out of plane retardation control); or (b) two orthogonal planar directions to produce controllable in-plane retardation control.

The application of an embodiment to switchable liquid crystal Graded Refractive Index (GRIN) lenses will be described below. Such switchable GRIN lenses have been reported previously. One known type of LC GRIN lens is activated by an inhomogeneous electric field. However, these lenses require a complex array of electrodes and a driving scheme in order to obtain the correct lateral molecular configuration to focus incident light [S. Sato J. Appl. Phys., 18, 1679 (1979)]. Polymer dispersed liquid crystal (PDLC) GRIN lenses have simple driving electronics and electrode structure but require high driving voltages and have a width of order 1 cm [H. Ren and S-T Wu, App. Phys. Letts., 82, 22 (2003)]. Owing to constraints in neutral density mask production, PDLC lenses have not been fabricated with widths less than 1 cm and hence are unlikely to be fabricated into a microlens array.

Figure 8:
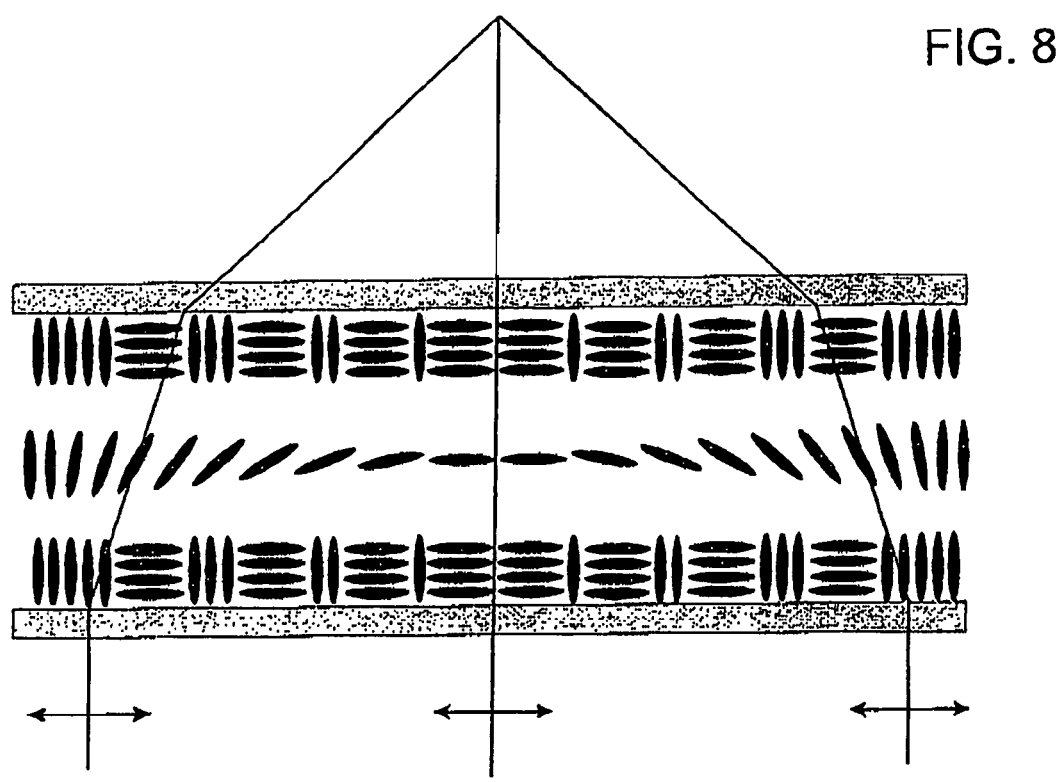
FIG. 8 illustrates the application of an embodiment of the present invention to a positive splay-bend type of Graded Refractive Index (GRIN) Lens.

FIG. 8 illustrates one possible application of the present invention in the form of a switchable liquid crystal Graded Refractive Index (GRIN) Lens that focuses light of one linear polarisation while transmitting the orthogonal polarisation. To achieve a switchable GRIN lens via micropatterning in an embodiment of the present invention, the proportions of homeotropic to planar alignment are altered laterally. This lateral variation in microalignment enables an appropriate bulk director profile to be obtained for focussing light, as is demonstrated in FIG. 8. In this device, the effective refractive index for the focussed light increases from the edge of the lens towards the centre of the lens. Therefore the lens will focus incident light of the correct polarisation. This type of lens is referred to as a positive GRIN lens.

By interchanging the planar aligned regions with homeotropic aligned regions and vice versa in the positive GRIN lens, the effective refractive index of the device would decrease from the edge of the lens towards the centre. This type of lens will cause incident light of the correct polarisation to diverge from a virtual focal point. This is a negative GRIN lens.

Figure 9:
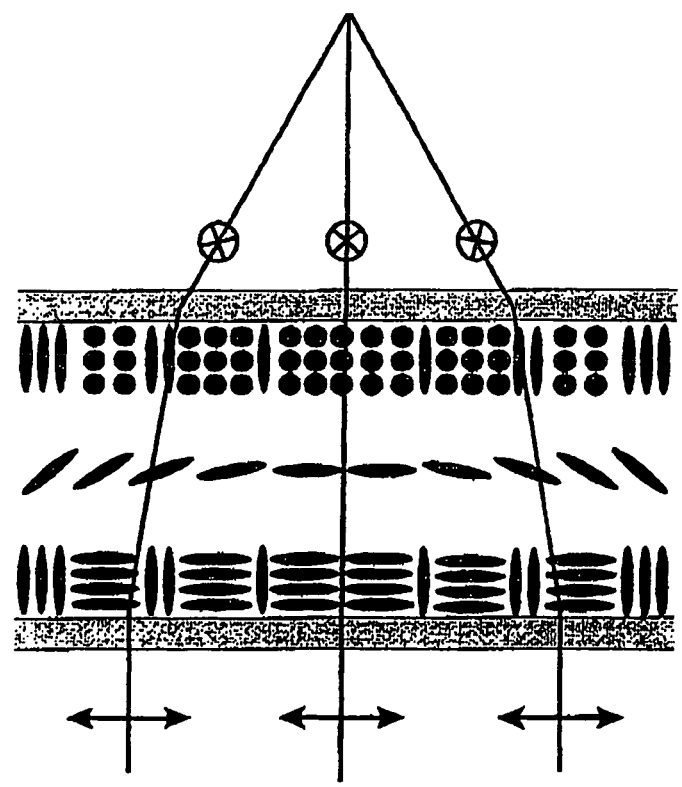
FIG. 9 illustrates the application of an embodiment of the present invention to a positive twisted nematic (TN) Graded Refractive Index (GRIN) Lens.

A variation of the switchable micropatterned GRIN detailed described with reference to FIG. 8 is the Twisted Nematic (TN) GRIN lens, as illustrated in FIG. 9. This device has similar lateral patterning as for FIG. 8, except that the top substrate is rotated (twisted) an arbitrary angle with respect to the bottom substrate. Without chiral doping, the maximum allowable twist is 90°. The principle of this device is that for a positive lensing structure (i.e. effective refractive index increases from the edges of the lens to the centre) a given linear polarisation state is simultaneously focussed while the plane of the polarised light is rotated. The angle through which the linear polarised light is rotated is equal to the rotation of the top substrate with respect to the bottom substrate. For the device to operate correctly, the Mauguin regime ($\lambda << 0.5 \, p\Delta n$) must be satisfied at all points across the lens. Therefore there is a practical constraint upon the maximum allowable bulk pretilt ($\theta$). As $\theta$ increases, $\Delta n$ decreases as $\Delta n = n_{eff} - n_o$ and $1/n_{eff}^2 = (\sin^2 \theta / n_o^2) + (\cos^2 \theta / n_e^2)$.

The embodiment described above with reference to FIG. 8 is a liquid crystal Graded Refractive Index (GRIN) Lens that focuses light of one linear polarisation while transmitting the orthogonal polarisation substantially unaffected. In the FIG. 8 embodiment, the patterning applied to both the top and bottom substrates was such as to induce a director profile having a lateral splay-bend deformation in the x-y plane in the entire bulk that results in a lens function for light of one particular polarisation only. An alternative is to provide patterning to both substrates so as to induce a director profile having a lateral twist deformation in the x-y plane, rather than a splay-bend deformation, in the entire bulk. The twist deformation will result in a lens function for light of one linear polarisation while the splay-bend deformation will result in a lens function for the orthogonal linear polarisation. Such a twist configuration lens is illustrated in FIG. 10.

Figure 10:
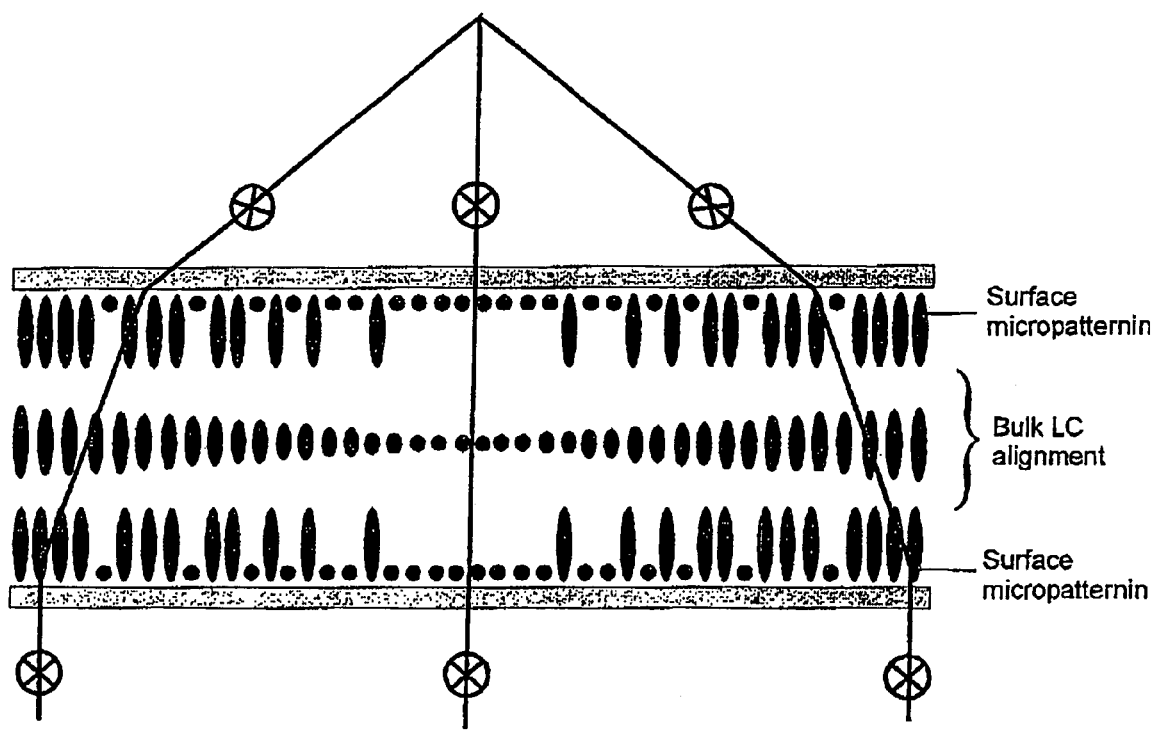
FIG. 10 illustrates the application of an embodiment of the present invention to a positive twist type of Graded Refractive Index (GRIN) Lens.

In both the FIG. 8 and FIG. 10 embodiments, both top and bottom substrates have patterned alignment layers. These can be termed as "Fredericks" devices, implying that there is patterned alignment on both substrates. In an alternative configuration, alignment patterning is on a single substrate only, with the opposite substrate having alignment but where this alignment is unpatterned; this can be termed a hybrid aligned nematic or "HAN" device. It will be appreciated that an embodiment of the present invention adopt any one of the following configurations: "Fredericks twist", "Fredericks splay-bend", "HAN twist" and "HAN splay-bend".

Figure 11:
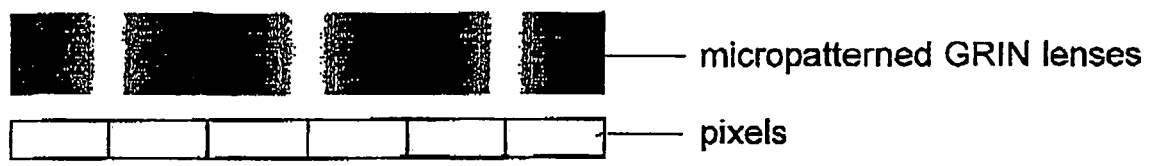
FIG. 11 illustrates an application of an embodiment of the present invention in a multiple view display device.
Figure 12:
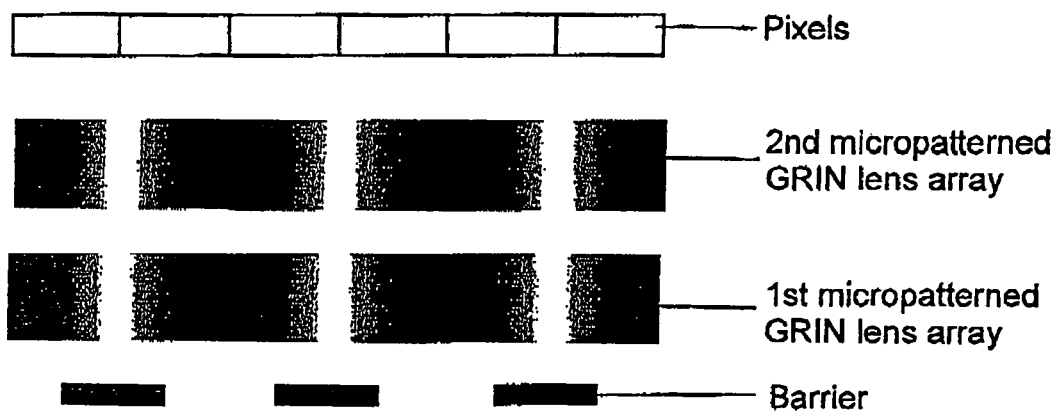
FIG. 12 illustrates another application of an embodiment of the present invention in a multiple view display device.

The lenses formed using the above technique can also be tiled to form a microlens array. This makes them particularly useful as the parallax element, or for pixel imaging or for parallax barrier aperture imaging, in multiple view and three-dimensional autostereoscopic display devices, which are described generally in the literature. The use of an embodiment of the present invention as a "soft" parallax barrier has been described above. Additionally, a microlens array formed by a technique embodying the present invention can be used directly as a lenticular-type parallax element, as is illustrated schematically in FIG. 11. A microlens array formed by a technique embodying the present invention can also be used in a multiple view type display where a parallax barrier, aperture or pixel is re-imaged using a lens system, for example as disclosed in GB-A-2405543; this type of arrangement is illustrated schematically in FIG. 12.

Figure 13:
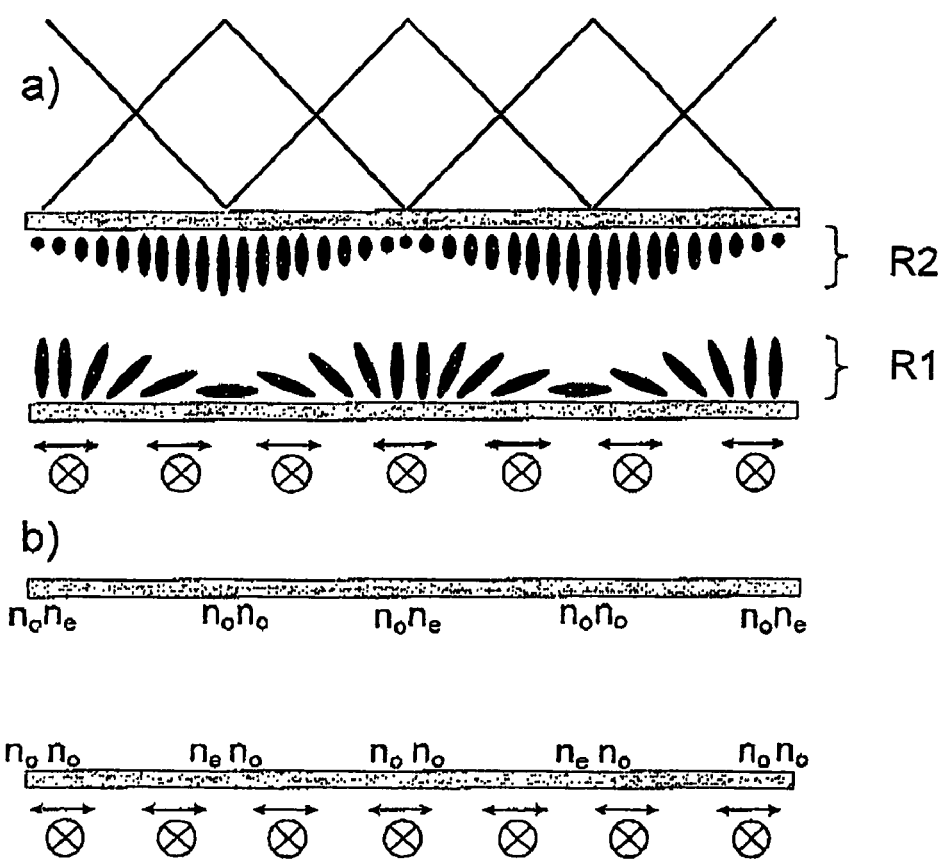
FIGS. 13(a) and 13(b) illustrate the application of an embodiment of the present invention to a positive polarisation-independent Graded Refractive Index (GRIN) Lens.

The embodiments described above with reference to FIGS. 8 to 10 are intended to focus light of one linear polarisation while transmitting the orthogonal polarisation substantially unaffected. FIG. 13(a) illustrates a GRIN lens embodying the present invention that is able to focus light of both linear polarisations, or completely unpolarised light. The FIG. 13(a) embodiment achieves this essentially by combining a GRIN lens having a splay-bend configuration with one having a twist-configuration. As shown in FIG. 13(a), the top and bottom substrates are patterned so as to provide a twist lens in a region R2 towards the top substrate and a splay-bend lens in a region R1 towards the bottom substrate, which cooperate to focus unpolarised light. The exact details of the micropatterning on the top and bottom substrates are not shown, but would be clear to the skilled person from the description elsewhere herein. The LC orientations illustrated in FIG. 13(a) are the bulk orientations induced by the two respective substrates, rather than the surface alignment near the respective substrates. The director profile that extends laterally across the lower substrate has a splay-bend (in the plane of the page) deformation and focuses light polarised parallel to plane of the page. The director profile that extends laterally across the top substrate has a twist deformation (twisting into the plane of the page) and focuses light polarised perpendicular to the plane of the page. The spatial distribution of the refractive index experienced by the two different polarisation states is illustrated in FIG. 13(b).

The period of the patterning on the substrate and superstrate can be either similar or dissimilar. The top substrate twist lens and the bottom substrate splay-bend lens illustrated in FIG. 13(a) have identical pitches but are laterally 180 degrees out-of-phase with each other, consequently the two polarised states are focussed to different spatial positions. The relative position of the top substrate with respect to the bottom substrate determines whether the focal positions for the two polarised states are coincident or not. At a given lateral position in the device, if the average tilt at the bottom substrate is approximately the same as the average tilt at the top substrate then the foci for the two polarised states will be coincident; this represents bottom and top substrate patterning that is "in-phase".

A GRIN lens embodying the present invention has the advantage that it will focus light even when there is no applied voltage. The focusing action can also be eliminated with the application of a suitable voltage across the LC layer. The f-number of the lens can also be varied continuously between these two extremes by varying the applied voltage at an intermediate level. This has the effect of varying the focal length of the lens. Also, since the focussing action in this embodiment is effective only for a particular linear polarisation, such a device embodying the present invention can be switched, or its focussing effect modulated, by switching or altering the polarisation of the input light without any direct intervention with the lens structure itself. Of course, for simple applications a fixed GRIN lens embodying the present invention can be supplied without any means to apply a voltage across the LC layer, or any other type of switching means.

Figure 14:
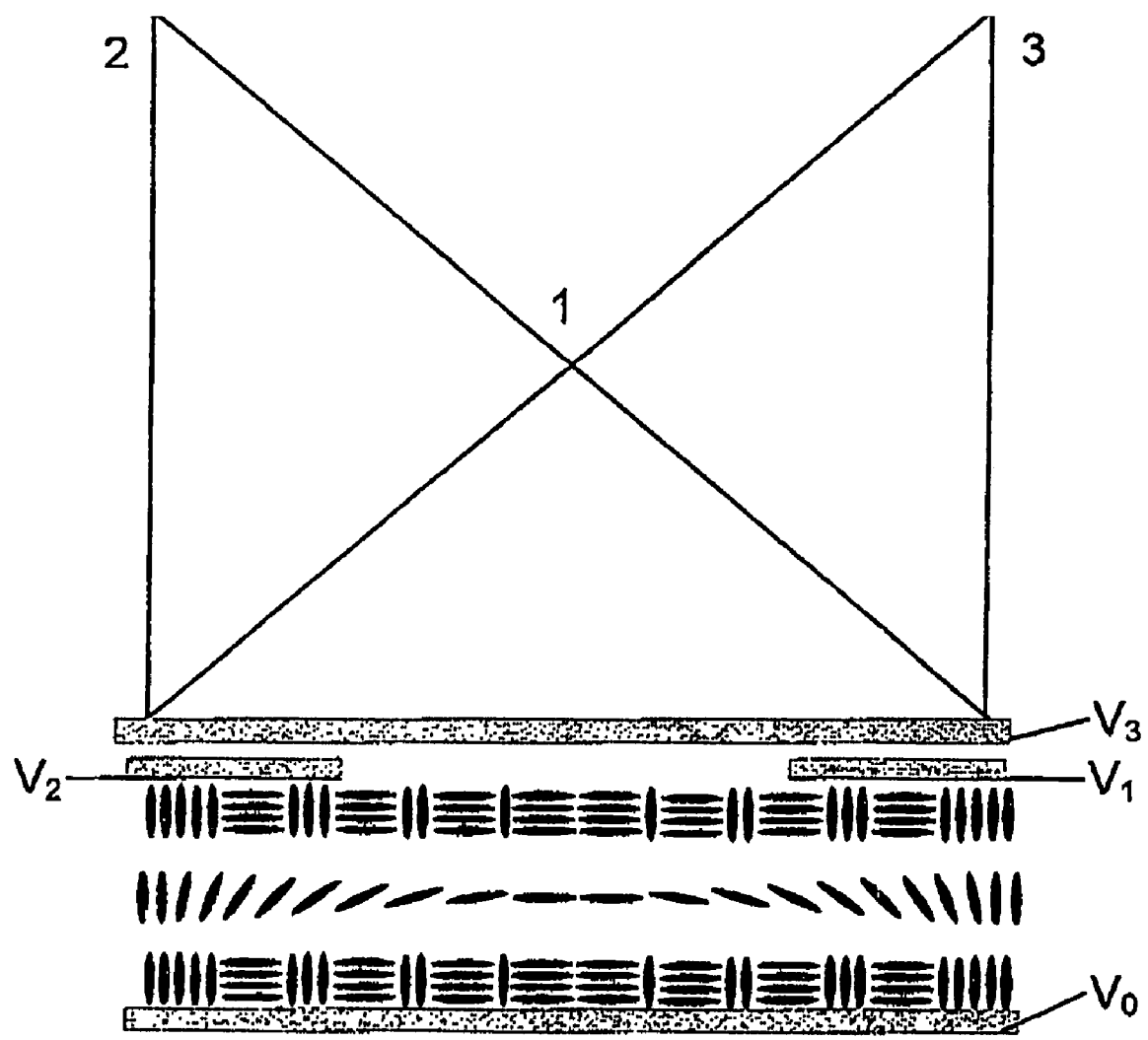
FIG. 14 illustrates a GRIN lens embodying the present invention incorporating segmented electrodes.

More complex control of the lens function is possible using a segmented electrode arrangement to produce the applied field, and an example of this is shown in FIG. 14, In the embodiment shown in FIG. 14, which is based on a GRIN lens of the type described above with reference to FIG. 8, uniform electrodes V0 and V3 are used in conjunction with segmented electrodes V1 and V2 to allow the lateral (left-right) position of the lens focus to be changed. This lateral shifting of the focus is achieved by generating an asymmetric LC phase alignment profile from a symmetric phase profile using the electrodes. With no potential difference between electrodes V0, V1, V2 and V3, the lens focuses incident linearly polarised light to a position marked as "1" in FIG. 14. If the potential difference between V0 and V1 is non-zero, and the potential difference between V0, V2 and V3 is zero, then the lens focuses incident linearly polarised light to a position marked as "3". If the potential difference between V0 and V2 is non-zero, and the potential difference between V0, V1 and V3 is zero, then the lens focuses incident linearly polarised light to a position marked as "2". Any potential difference between V0 and V3 will move the longitudinal (up-down) position of the focal point to a position further from the liquid crystal layer. With a suitably large potential difference between V0 and V3, the focus occurs at infinity (i.e. having no lens function).

Figure 15:
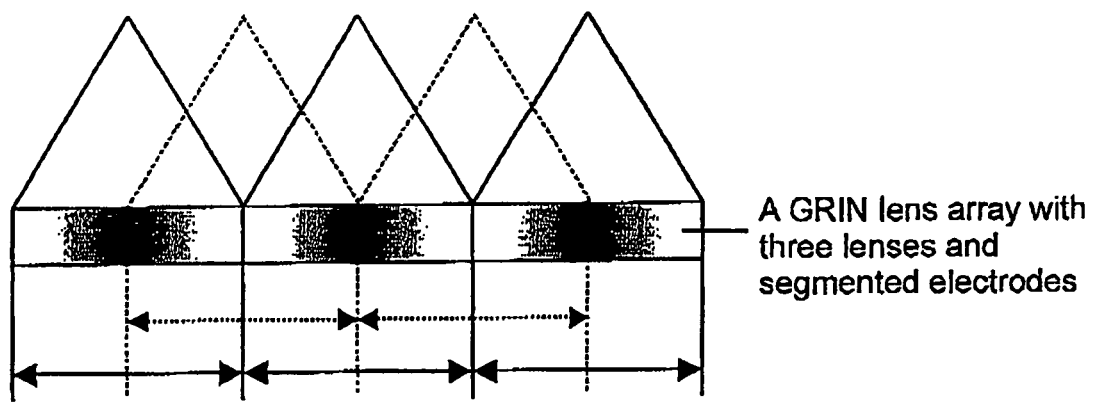
FIG. 15 illustrates a GRIN lens incorporating segmented electrodes according to a farther embodiment of the present invention.
Figure 16:
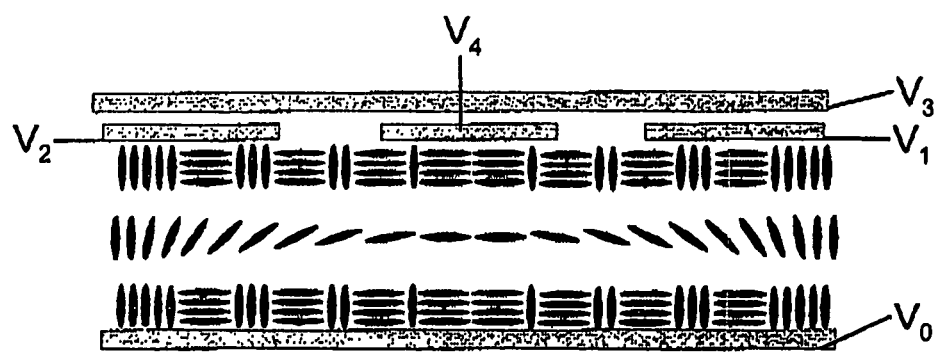
FIG. 16 illustrates a GRIN lens incorporating segmented electrodes according to a further embodiment of the present invention.

FIG. 15 illustrates a GRIN lens array embodying the present invention in which light can either follow the dotted path shown in FIG. 15, or the solid path, but not both paths simultaneously. The use of segmented electrodes can be used to switch light from the dotted path to the solid path. This is achieved by laterally shifting the symmetric phase profile by up to half the pitch of the lens, so that the overall effect is to shift the centre of the lens laterally. This can be achieved using a segmented electrode arrangement as shown in FIG. 16, in which segmented electrodes V1, V2 and V4 and uniform electrodes V0 and V3 are used in conjunction with a dual frequency liquid crystal material in a GRIN lens configuration. If the potential difference between all electrodes is zero, then the device focuses light in a manner previously described. If respective potential differences between each of the segmented electrodes V1, V2, V4 and the electrode V0 are non-zero then homeotropic (vertical) aligned sections of the lens can be switched planar while planar aligned sections of the lens are switched homeotropic (vertical) for a dual frequency liquid crystal material. Consequently, the focal position is shifted laterally (left-right in FIG. 16). A suitable potential difference between V0 and V3 will move the longitudinal (up-down) position of the focal point to a position further from the liquid crystal layer. With a suitably large potential difference between V0 and V3, the focus occurs at infinity (no lensing function is performed).

Various other types of electrode segmentation would be readily apparent to the skilled person. For example, with an appropriately-segmented electrode arrangement, a first lateral region of the LC layer could be applied with a large electric field, with a second lateral region having no applied field. The lens function of the first region would be disabled, leaving only the lens function of the second region. If the segmented electrode arrangement is aligned with a GRIN lens army embodying the present invention, then individual lenses in the array, or a group or groups of lenses, could be switched on and off independently.

Figure 17:
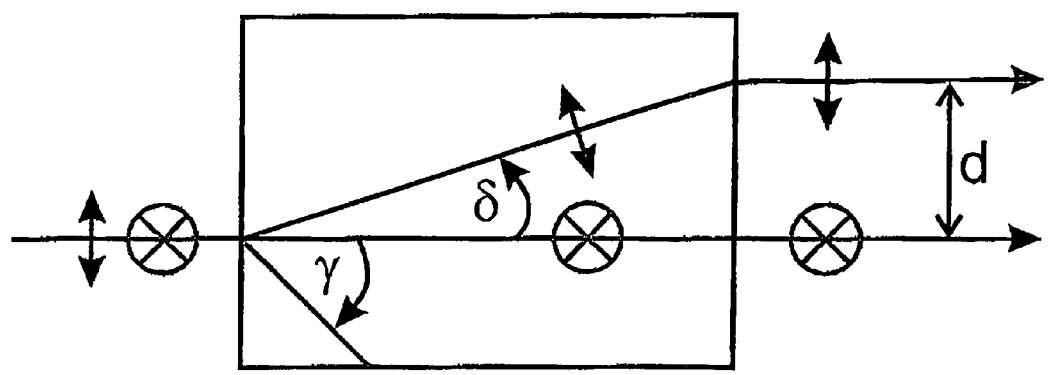
FIG. 17 illustrates the application of an embodiment of the present invention to a switchable image shifter.

The bulk LC alignment pattern produced by the alignment layer or layers cooperates with the patterning of the field applied by the segmented electrodes to provide a flexible and configurable microlens arrangement As described above, the lens' spatial positioning could be altered during operation, as could their widths and focal length. This ability makes this type of optical arrangement particularly useful in a multiple view display device incorporating viewer tracking and/or time multiplexing capabilities, Another application of the present invention is a switchable image shifter device, as shown in FIG. 17. In this embodiment the LC alignment is patterned such that an angle γ is formed between the optic axis of the LC layer and light incident normal to one of the surfaces. With no voltage applied, the device spatially separates light into two linearly polarised components via the mechanism of double refraction. The angle δ is the "walk off" angle that light polarised in the plane of the optic axis experiences. The degree of beam separation (indicated by "d" in FIG. 17) is a function of the effective liquid crystal birefringence, the angle of the optic axis relative to the incident angle (i.e. the walk off angle) and the thickness of the device. For optimal spatial splitting, $30°<\gamma<60°$. Suitable micropatterning of the device's surfaces with regions of homeotropic and planar alignment using a method embodying the present invention will give the desired bulk optic axis tilt angle. On application of a suitable voltage, the optic axis can be substantially realigned and consequently the device would revert to an inert optical element that has no effect on transmitted light.

There has not been any previous disclosure of a switchable image shifter, although passive (unswitchable) image shifters are common and usually fabricated from single crystals of quartz or calcite. Obtaining suitable sized and cut crystals can be difficult and lead-times are generally long (6 months or more), so an image shifter made according to an embodiment of the present invention has distinct advantages even in an non-switchable form.

Zenithally bi-stable devices have been reported in the literature that can be switched between two stable bulk molecular alignment configurations [Proceedings of Society for Information Display International Symposium. Digest of Technical Papers Volume XXVIII, Boston, Mass., USA (1997) 5.3, pp. 37-40]. In order to achieve this operation, one alignment surface is a physical surface relief grating, while the other surface is either uniform planar or homeotropic. Through the interaction of an applied electric field and the grating induced flexoelectric polarisation of the LC, the device can be made to switch into one of two stable states.

Figure 18:
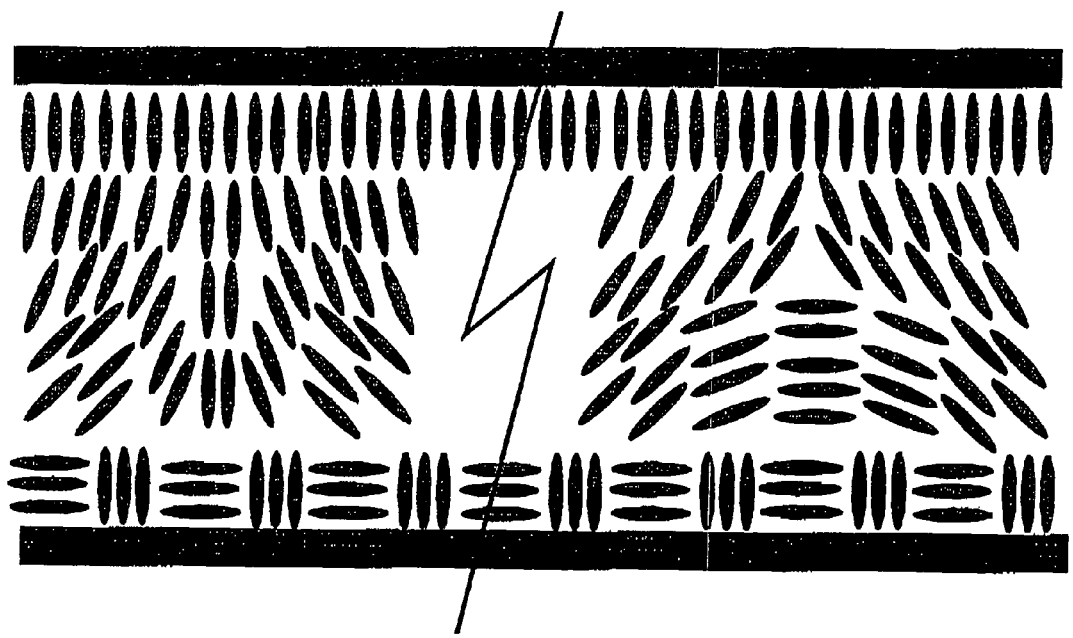
FIG. 18 illustrates a zenithally bi-stable device according to an embodiment of the present invention.

A device that operates in a similar fashion can be realised through the appropriate use of surface alignment patterning according to an embodiment of the present invention (see FIG. 18). Patterned processing steps can be used to fabricate regions of substantially +45° tilt and −45° tilt (or any other suitable angle depending on the application, for example an angle between ±30° and ±60° may be appropriate in other applications). The interaction of the tilt induces flexoelectric polarisation and an applied field enables the device to switch into one of two macroscopic states. Both of these states are energetically stable (i.e. whatever state is selected, it remains even upon removal of the applied electric field). By application of suitable waveforms, either a continuous state (left hand side of FIG. 18) or a discontinuous state (right hand side of FIG. 18) can be formed. Attaining a uniform (or modulated) surface relief grating structure according to the prior art for this purpose is troublesome. Consequently any small deviations from the desired grating structure effects switching conditions adversely. The simplicity of forming a device that operates in an equivalent manner via two patterned processing steps according to an embodiment of the present invention has fabrication and yield advantages.

Figure 19:
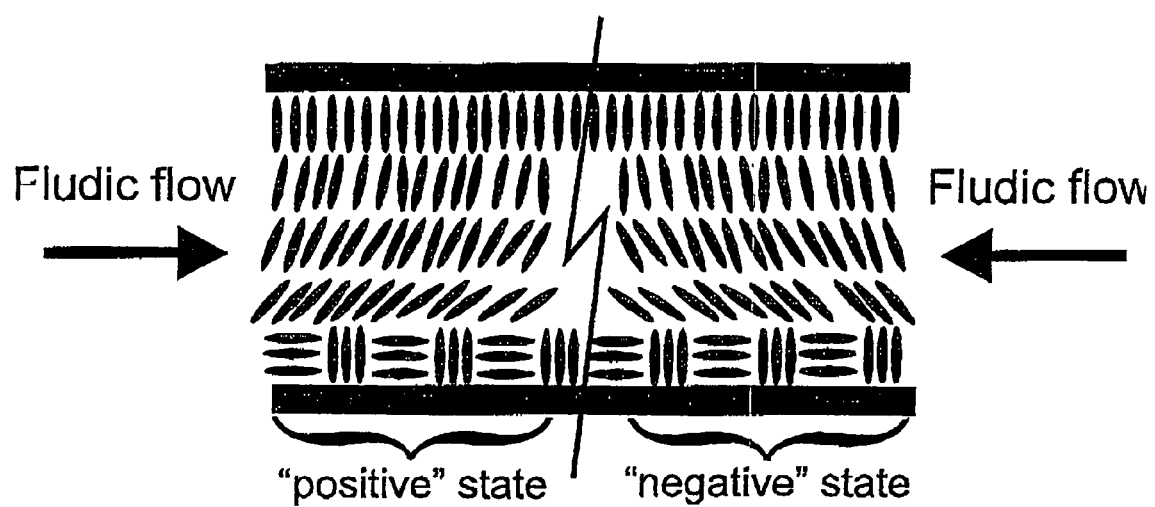
FIG. 19 illustrates a bi-stable hybrid aligned nematic device according to an embodiment of the present invention.

Another type of bi-stable device that can be realized according to an embodiment of the present invention is a bi-stable hybrid aligned nematic (BHAN) device, and a BHAN device embodying the present invention is illustrated in FIG. 19. Suitable micropatterning of the device's surfaces with regions of homeotropic and planar alignment, using a method embodying the present invention, will result in a bulk-averaged tilt adopting either a "positive" or "negative" tilt angle as illustrated in FIG. 19. The two stable states are minor images of each other and are energetically degenerate. The left hand side of FIG. 19 shows the device in a stable "positive" state, with the liquid crystal bulk orientation leaning in one direction, and the right hand side of FIG. 19 shows the device in the alternate stable "negative" state, with the liquid crystal bulk orientation leaning in the opposite direction. Patterned processing steps can be used to fabricate regions having stable states of substantially +45° and −45° tilt (or any other suitable angle depending on the application, for example an angle between 30° and 60° may be appropriate in other applications, or even between 10° and 80°).

A suitable electric field can be used to switch between the stable states by coupling to the dielectric anisotropy and/or the flexoelectric component of the liquid crystal. La addition, a bulk fluid flow of liquid crystal in a direction substantially parallel to the substrates will cause the device to switch between stable states, according to the direction of fluid flow. A fluid flow in a particular direction (right-ward or left-ward in the device shown in FIG. 19) will cause the device to switch into the stable state with the bulk liquid crystal orientation leaning in that direction. This fluid flow induced switching can be achieved either by mechanical or electrical means. A mechanical deformation to the substrates can be used to cause switching, and this is an example of a touch sensitive LC mode. A suitable electric field can also be used to induce a bulk fluid flow that mediates the switching between the stable states.

The present invention also has applications to surface mode liquid crystal devices, which are devices in which optical change caused by varying the field across the liquid crystal occurs primarily in the surface layers of the liquid crystal. One example of such a device is known as a pi-cell, in which the liquid crystal is disposed between alignment layers which create parallel alignment. An embodiment of the present invention can also be applied to achieve threshold-less switching of pi-cells, as will be described below.

Surface mode liquid crystal devices (LCDs) are disclosed in Mol Cryst. Liq. Cryst., 1972, 19, 123-131 "Deformation of Nematic Liquid Crystals in an Electric Field", Sov. J. Quant. Electron., 1973, 3, 78-9, "Electo-Optic Switching in Oriented Liquid Crystal Films", and U.S. Pat. No. 4,385,806. LCDs of the pi-cell type are disclosed in Mol Cryst. Liq. Cryst., 1984, 113, 329-339, "The Pi-cell: A Fast Liquid Crystal Optical Switching Device.", U.S. Pat. No. 4,635,051 and GB 2 276 730. A typical known pi-cell structure comprises a liquid crystal layer disposed between parallel-rubbed polyimide alignment layers and provided with suitable addressing electrodes. A display using this structure provides fast switching times between on and off states, for instance of the order of a millisecond or less.

Figure 20:
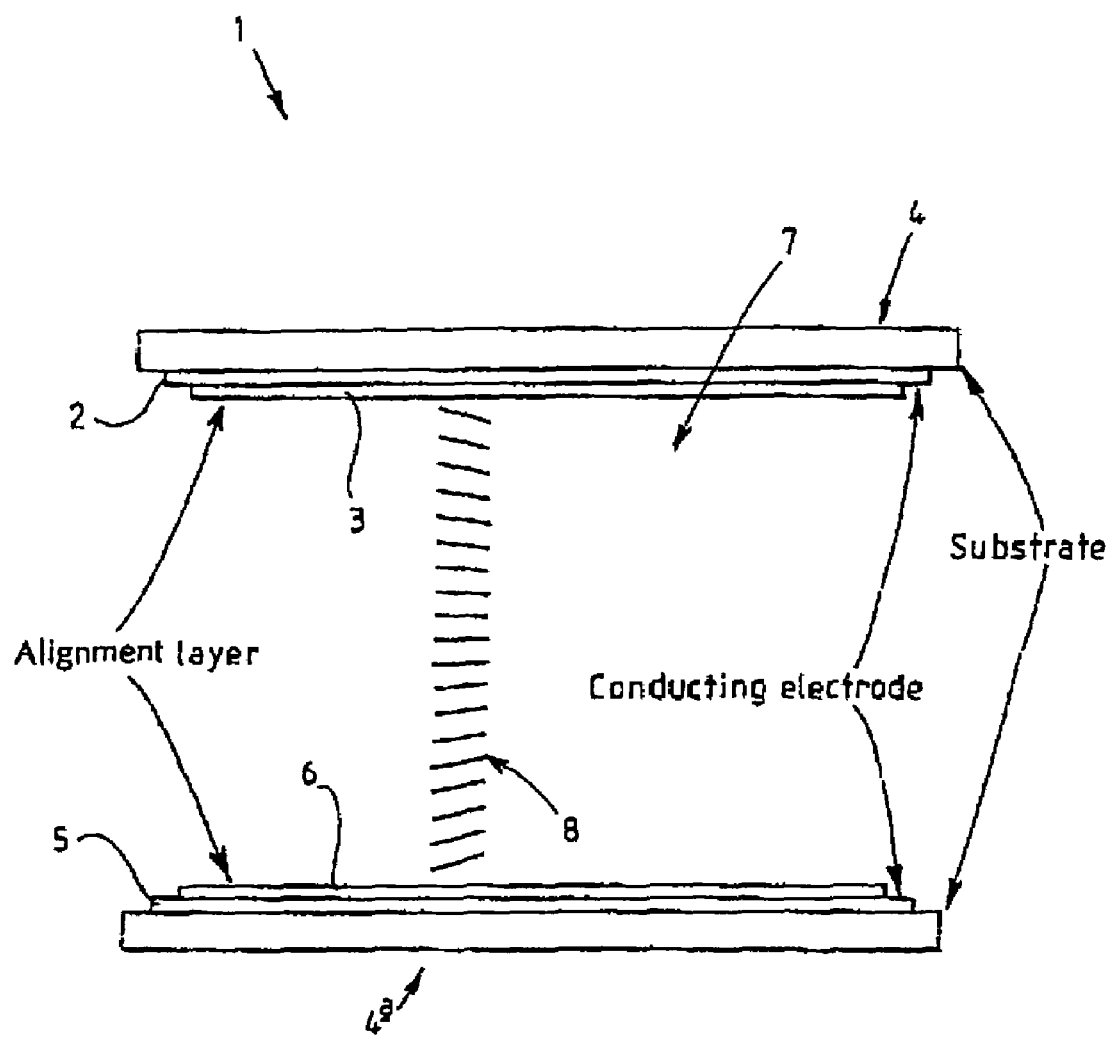
FIG. 20 is a schematic diagram illustrating a pi-cell in a splay state.

In the absence of an electric field across the liquid crystal layer, known types of liquid crystal is in a splay mode (or H-state), as described in more detail hereinafter. For a known display to operate in the pi-cell node, the liquid crystal has to be transformed in to the V state, as also described hereinafter in more detail, by the application of a suitable electric field. However, when a suitable field is initially applied, it takes several seconds for the display to change to the V state. Transformation from the splay state to the V state occurs when the voltage across the cell electrodes exceeds a critical (threshold) voltage and the drive voltage for the cell must therefore always exceed this critical voltage during operation of the display. If the drive voltage falls below a critical value, the liquid crystal relaxes to a twisted state, in which there is a 180 degree twist of the liquid crystal between the alignment surfaces:

FIG. 20 shows a known type of liquid crystal device comprising a cell 1 having a first substrate 4 on which are deposited a conducting electrode 2 and an alignment layer 3. A second substrate 4a similarly carries a conducting electrode 5 and an alignment layer 6. A liquid crystal 7 forms a layer between the alignment layers 3 and 6. FIG. 20 illustrates the splay state of the cell which is the state adopted by the liquid crystal 7 in the absence of an electric field, in particular in the absence of a potential difference between the electrodes 2 and 5. The directors of the liquid crystal molecules are illustrated by the short lines at 8. At the surfaces of the alignment layers 3 and 6, the directors are substantially parallel to each other (in the plane of the cell) and point in the same direction. The liquid crystal directors at the alignment layers 3 and 6 have a pretilt of the order of between 1 and 10 degrees with respect to the surfaces of the alignment layers 3 and 6. The directors of the liquid crystal throughout the cell are parallel or nearly parallel to each other as illustrated.

Figure 21:
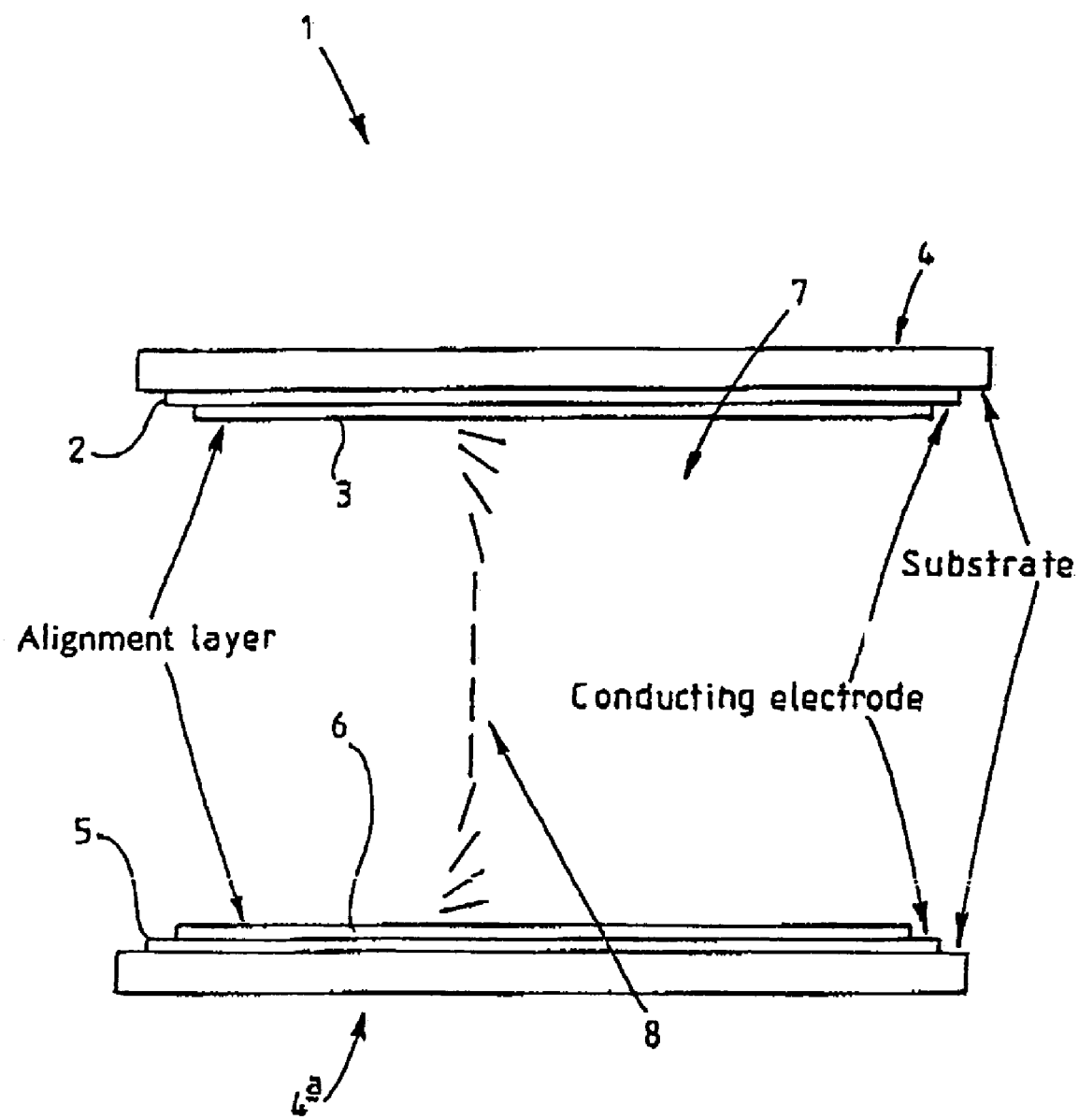
FIG. 21 is a schematic diagram illustrating the cell of FIG. 20 in the V state.

In order to establish pi-cell operation, the liquid crystal has to be changed to the V state as shown in FIG. 21. An alternating voltage is applied between the electrodes 2 and 5 with an RMS amplitude greater than a threshold value, which is of the order of 1.5 to 2 volts for the liquid crystal material E7, so that the liquid crystal changes from the splay state to the V state illustrated by the liquid crystal molecule directors in FIG. 2. As described hereinbefore, it takes some time for the V state to be established, typically of the order of seconds or even minutes. Once the V state has been established, in known cells, the drive voltage must not fall below a predetermined value in order to maintain pi-cell operation in the V state. During normal operation in the pi-cell mode, the directors in the liquid crystal layers adjacent the alignment layers 3 and 6 change direction in accordance with the amplitude of the voltage applied between the electrodes 2 and 5. This causes the retardation of the cell to vary and this effect may be used to provide a display as described hereinafter.

When the drive voltage applied to the electrodes 2 and 5 is reduced below a critical voltage (typically about 1.2 to 1.6 volts for the liquid crystal material E7), the liquid crystal 7 relaxes from the V state to the twist state. If the drive voltage remains below this voltage for any substantial time, the twist state gradually relaxes further to the slay state, which typically takes from less than a second to a few minutes. If a suitable drive voltage is re-applied to the cell when in the twist state, the liquid crystal 7 may be returned directly to the V state, although the response times for the transitions to and from the twist state are very much slower than typical response times for switching within the V state. However, if any domains of splay have formed in the twist regions, the initial slow transition from the splay state to the V state must be repeated to remove these domains.

It is generally desirable to be able to stabilise the liquid crystal in the V state to avoid the above disadvantages, and such that the V state would be retained in the absence of an applied field across the liquid crystal. No time would then be required to reform the V state after the device has been switched off. Further, such a device may be used with a drive scheme in which one drive voltage is zero. Previous proposals have included the use of a polymer to stabilise cholesteric features of a LCD (The Conference record of the International Display Research Conference, 1991, 49-52 "Cholesteric Liquid Crystal/Polymer Gel Dispersion Bistable at Zero Field"). The display is formed by adding a small quantity of monomer to a cholesteric liquid crystal. Polymerisation of the monomer alters the switching properties of the display such that two quasi-stable states are formed. These states can exist in the absence of an applied field across the liquid crystal and can be addressed by appropriate voltage pulses across the liquid crystal.

A method of allowing simultaneous control of macroscopic azimuthal and zenithal liquid crystal alignment across a LC layer according to an embodiment of the present invention can used to tailor the LC pretilt angle. By doing so the H-state can be prevented from forming and the need to nucleate the V-state is removed. A large enough pretilt angle, for example between approximately 40° and 55°, would prevent the H-state forming so that the pi-cell is always in the desired V-state.

The operation of a multiplexed super twisted nematic panel relies on a steep electrooptic curve (i.e. a large change in transmission for a small change in voltage). However, a steep electrooptic curve for LC cells in this configuration gives rise to an unwanted stripe deformation In the striped pattern the local optic axis changes its orientation along two spatial co-ordinates, one perpendicular to the layer and one parallel to the layer (the stripes run perpendicular to the local optic axis in the middle of the cell).

The Conference record of the International Display Research Conference, 1994, 480-483, "Polymer Stabilised SBE Devices" discloses a technique for inducing a bulk pretilt of the liquid crystal in super-twisted birefringent effect (SBE) devices also known as super-twisted nematic (STN) devices. A monomer is added to the liquid crystal and is polymerised while applying a voltage across the liquid crystal cell. The effect of the polymer is to eliminate stripe formation from SBE or STN displays by inducing a bulk pretilt of the liquid crystal. However, the polymer slows the switching speed of the STN device.

The stripe deformation can be prevented from forming in cells with a sufficiently large pretilt ($\theta \sim > 10°$), and the desired pretilt can be achieved easily with an embodiment of the present invention.

What is claimed is:

1. A method allowing simultaneous control of macroscopic azimuthal and zenithal liquid crystal (LC) alignment across a LC layer by controlling the area ratios between first, second and third different types of alignment region in a patterned alignment layer, the three different types of alignment region tending to induce LC alignment in the LC layer in three different respective, non-coplanar, principal orientations, wherein the first type of alignment region tends to induce substantially homeotropic alignment and the second and third types of alignment region tend to induce substantially planar alignment in different respective principal orientations, and wherein control of macroscopic zenithal LC alignment is achieved by controlling the area ratios between the homeotropic and planar region types, and control of macroscopic azimuthal LC alignment is achieved by controlling the area ratio between the two planar region types.

2. A method as claimed in claim 1, wherein the second and third types of alignment region tend to induce alignment in substantially orthogonal principal orientations.

3. A method as claimed in claim 1, wherein the alignment layer is patterned by providing an alignment layer having a substantially uniform initial alignment of the first type, applying a first patterning step to create alignment regions of the second type and a second patterning step to create any required alignment regions of the third type.

4. A method as claimed in claim 1, wherein the area ratio between the third and second types is zero for only part of the LC layer.

5. A method as claimed in claim 1, wherein at least one of the types of alignment region has two choices of slightly different alignment to provide further control of macroscopic LC alignment.

6. A method allowing simultaneous control of macroscopic azimuthal and zenithal liquid crystal (LC) alignment across a LC layer by controlling the area ratios between first, second and third different types of alignment region in a patterned alignment layer, the three different types of alignment region tending to induce LC alignment in the LC layer in three different respective, non-coplanar, principal orientations, wherein at least one of the types of alignment region has two choices of slightly different alignment to provide further control of macroscopic LC alignment, and the second type of alignment region has two such choices, with the two choices of the second type being used on opposite sides of an alignment region of the first type.

7. A method as claimed in claim 1, wherein the alignment layer is patterned at least in part by photoalignment.

8. A method as claimed in claim 1, wherein the alignment layer is patterned at least in part by rubbing.

9. A method as claimed in claim 1, wherein the alignment layer is patterned at least in part by surface relief grating.

10. A method as claimed in claim 1, wherein the alignment layer is patterned at least in part by the selective printing of at least two types of material one on top of another, each type of material tending to induce a type of alignment different to another type of material of the at least two types.

11. A method as claimed in claim 1, wherein the alignment layer is patterned at least in part by forming at least two layers of material, each layer tending to induce a type of alignment different to another layer, and selectively removing parts of at least one of these layers to expose parts of at least one layer beneath.

12. A method as claimed in claim 1, wherein the alignment layer is patterned at least in part by selectively modifying the surface energy of the alignment layer.

13. A method as claimed in claim 1, wherein a second alignment layer is provided on a face of the LC layer opposite the patterned, first, alignment layer.

14. A method as claimed in claim 13, wherein the two alignment layers cooperate to induce a macroscopic pattern of liquid crystal alignment ($\phi$), ($\theta$) that rotates the polarisation of incident light of a particular linear polarisation.

15. A method as claimed in claim 13, wherein the two alignment layers cooperate to induce a V-state pi-cell pattern of liquid crystal alignment in the LC layer.

16. A method as claimed in claim 13, wherein the second alignment layer is also patterned.

17. A method as claimed in claim 16, wherein the second alignment layer is
provided with the same patterning of alignment region types as the first alignment layer.

18. A method as claimed in claim 16, wherein the first alignment layer induces a first macroscopic pattern of liquid crystal alignment in a first region of the LC layer, and the second alignment layer induces a second macroscopic pattern of liquid crystal alignment, different to the first macroscopic pattern, in a second region of the LC layer, substantially distinct from the first region of the LC layer.

19. A method as claimed in claim 16, wherein the first and second regions form respective sub-layers within the LC layer, with the first region being disposed between the first alignment layer and the second region.

20. A method as claimed in claim 1, wherein the alignment layer patterning is periodic at least in part.

21. A method as claimed in claim 1, wherein the alignment layer patterning is random at least in part.

22. A method as claimed in claim 1, wherein at least one lateral dimension of the patterned types of region is comparable to or less than the thickness of the LC layer.

23. A method as claimed in claim 1, wherein macroscopic alignment changes are achievable on a scale comparable to or less than the thickness of the LC layer.

24. A method as claimed in claim 1, wherein at least one of the area ratios between first, second and third different types of alignment region varies across the alignment layer.

25. A method as claimed in claim 24, wherein the variation of the at least one area ratio occurs on a scale comparable to or less than the thickness of the LC layer.

26. A method allowing simultaneous control of macroscopic azimuthal and zenithal liquid crystal (LC) alignment across a LC layer by controlling the area ratios between first, second and third different types of alignment region in a patterned alignment layer, the three different types of alignment region tending to induce LC alignment in the LC layer in three different respective, non-coplanar, principal orientations, wherein
at least one of the area ratios between first, second and third different types of alignment region varies across the alignment layer, and
the variation is controlled such that the macroscopic pattern of liquid crystal alignment across the LC layer presents a varying retardation for incident light of a particular linear polarisation.

27. A method as claimed in claim 26, wherein the variation in retardation provides a wavefront modulation function for light of that polarisation.

28. A method as claimed in claim 26, wherein the variation in retardation provides a lens function for light of that polarisation.

29. A method as claimed in claim 26, wherein a second alignment layer is provided on a face of the LC layer opposite the patterned, first alignment layer, and wherein the second alignment layer is also patterned, and wherein the first alignment layer induces a first macroscopic pattern of liquid crystal alignment in a first region of the LC layer, and the second alignment layer induces a second macroscopic pattern of liquid crystal alignment, different to the first macroscopic pattern, in a second region of the LC layer, substantially distinct from the first region of the LC layer, and wherein the area ratios for the first and second alignment layers are varied, with the variation being controlled such that the first macroscopic pattern of liquid crystal alignment presents a varying retardation for incident light of a first linear polarisation, and the second macroscopic pattern of liquid crystal alignment presents a varying retardation for incident light of a second linear polarisation. different to the first linear polarisation.

30. A method as claimed in claim 29, wherein the variation in retardation provides a lens function for both first and second linear polarisations.

31. A method allowing simultaneous control of macroscopic azimuthal and zenithal liquid crystal (LC) alignment across a LC layer by controlling the area ratios between first, second and third different types of alignment region in a patterned alignment layer, the three different types of alignment region tending to induce LC alignment in the LC layer in three different respective, non-coplanar, principal orientations, wherein a uniform macroscopic pattern of LC alignment is formed across the LC layer to form a birefringent optical element having its optic axis aligned at an angle to one of its surfaces so as to provide an image shifting function for light incident on that surface.

32. An optical device comprising a liquid crystal (LC) layer and at least one patterned alignment layer, the LC layer having a macroscopic pattern of azimuthal and zenithal LC alignment across the LC layer achieved using a method allowing simultaneous control of macroscopic azimuthal and zenithal liquid crystal (LC) alignment across a LC layer by controlling the area ratios between first, second and third different types of alignment region in the or each of the at least one patterned alignment layer, the three different types of alignment region tending to induce LC alignment in the LC layer in three different respective, non-coplanar, principal orientations, wherein the first type of alignment region tends to induce substantially homeotropic alignment and the second and third types of alignment region tend to induce substantially planar alignment in different respective principal orientations, and wherein control of macroscopic zenithal LC alignment is achieved by controlling the area ratios between the homeotropic and planar region types, and control of macroscopic azimuthal LC alignment is achieved by controlling the area ratio between the two planar region types.

33. An optical device as claimed in claim 32, having macroscopic zenithal alignment in at least part of the LC layer between 10 and 80 degrees away from planar alignment.

34. An optical device as claimed in claim 32, wherein the macroscopic alignment pattern has two or more stable configurations.

35. An optical device as claimed in claim 34, wherein the macroscopic alignment is switchable between the two or more stable configurations by applying an electric field and/or applying a magnetic field and/or applying a mechanical force and/or inducing a macroscopic fluid flow within the LC layer.

36. An optical device as claimed in claim 34, wherein the macroscopic alignment pattern has two stable configurations differing from one another in the macroscopic zenithal angle in at least part of the LC layer.

37. An optical device as claimed in claim 32, comprising an arrangement for applying an electric and/or magnetic field across at least part of the LC layer, such that the macroscopic alignment pattern of the at least part of the LC layer is dependent on the at least one alignment layer and on any applied field.

38. An optical device as claimed in claim 37, being switchable from a first mode in which the LC has a macroscopic alignment pattern determined substantially by the at least one alignment layer, to a second mode in which the LC has a macroscopic alignment pattern that is determined substantially by the applied field.

39. An optical device as claimed in claim 37, wherein the field-applying arrangement is operable to apply different electric and/or magnetic fields across different parts of the LC layer.

40. An optical device as claimed in claim 37, wherein the field-applying arrangement comprises electrodes.

41. An optical device as claimed in claim 40, wherein the field-applying arrangement is operable to apply different electric and/or magnetic fields across different parts of the LC layer, and wherein at least some of the electrodes are segmented.

42. An optical device as claimed in claim 32, comprising an arrangement for changing the polarisation of light input to the device.

43. A Graded Refractive Index, GRIN, lens comprising a liquid crystal (LC) layer and at least one patterned alignment layer, the LC layer having a macroscopic pattern of azimuthal and zenithal LC alignment across the LC layer achieved using a method allowing simultaneous control of macroscopic azimuthal and zenithal liquid crystal (LC) alignment across a LC layer by controlling the area ratios between first, second and third different types of alignment region in the or each of the at least one patterned alignment layer, the three different types of alignment region tending to induce LC alignment in the LC layer in three. different respective, non-coplanar, principal orientations, wherein at least one of the area ratios varies across the alignment layer such that the macroscopic pattern of liquid crystal alignment across the LC layer presents a varying retardation for incident light of at least one linear polarisation, and wherein the variation in retardation provides a lens function for light of the at least one polarisation.

44. A GRIN lens as claimed in claim 43, being a twisted nematic GRIN lens.

45. An optical retarder comprising a liquid crystal (LC) layer and at least one patterned alignment layer, the LC layer having a macroscopic pattern of azimuthal and zenithal LC alignment across the LC layer achieved using a method allowing simultaneous control of macroscopic azimuthal and zenithal liquid crystal (LC) alignment across a LC layer by controlling the area ratios between first, second and third different types of alignment region in the or each of the at least one patterned alignment layer, the three different types of alignment region tending to induce LC alignment in the LC layer in three different respective, non-coplanar, principal orientations, wherein at least one of the area ratios varies across the alignment layer such that the macroscopic pattern of liquid crystal alignment across the LC layer presents a varying retardation for incident light of at least one linear polarisation.

46. A parallax barrier comprising an optical retarder as claimed in claim 45 and at least one polariser.

47. A display device comprising an optical device as claimed in claim 32.

48. A display device comprising a GRIN lens as claimed in claim 43.

49. A display device comprising a parallax barrier as claimed in claim 46.

\* \* \* \* \*